US008825113B2

(12) United States Patent
Kim et al.

(10) Patent No.: US 8,825,113 B2
(45) Date of Patent: *Sep. 2, 2014

(54) PORTABLE TERMINAL AND DRIVING METHOD OF THE SAME

(75) Inventors: Jong-Hwan Kim, Seoul (KR); Tae Jin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 174 days.

This patent is subject to a terminal disclaimer.

(21) Appl. No.: 12/395,269

(22) Filed: Feb. 27, 2009

(65) Prior Publication Data

US 2010/0041431 A1 Feb. 18, 2010

(30) Foreign Application Priority Data

Aug. 18, 2008 (KR) ......................... 10-2008-0080504

(51) Int. Cl.
| | |
|---|---|
| *G06F 3/041* | (2006.01) |
| *G06F 1/16* | (2006.01) |
| *G06F 3/0488* | (2013.01) |
| *G06F 3/023* | (2006.01) |
| *G06F 3/01* | (2006.01) |
| *H04M 1/725* | (2006.01) |
| *H04M 1/23* | (2006.01) |

(52) U.S. Cl.
CPC .............. *G06F 3/017* (2013.01); *G06F 1/1643* (2013.01); *H04M 1/72547* (2013.01); *G06F 2203/04101* (2013.01); *G06F 3/04886* (2013.01); *G06F 3/0233* (2013.01); *H04M 2250/12* (2013.01); *H04M 2250/22* (2013.01); *H04M 1/72522* (2013.01); *H04M 1/236* (2013.01); *G06F 2203/04806* (2013.01); *G06F 2200/1637* (2013.01); *G06F 1/1694* (2013.01); *G06F 2203/0381* (2013.01); *G06F 1/1624* (2013.01); *G06F 1/1626* (2013.01)

USPC .................... 455/566; 455/550.1; 455/414.1; 345/173

(58) Field of Classification Search
USPC ................... 455/550.1, 575.1–575.7
See application file for complete search history.

(56) References Cited

U.S. PATENT DOCUMENTS

| | | | | |
|---|---|---|---|---|
| 8,593,415 | B2 * | 11/2013 | Han et al. ...................... | 345/173 |
| 2004/0263479 | A1 | 12/2004 | Shkolnikov | |
| 2005/0064913 | A1 | 3/2005 | Kim | |
| 2005/0212760 | A1 | 9/2005 | Marvit et al. | |
| 2005/0216867 | A1 * | 9/2005 | Marvit et al. ................. | 715/863 |
| 2006/0022955 | A1 * | 2/2006 | Kennedy ....................... | 345/173 |
| 2006/0071904 | A1 * | 4/2006 | Cho et al. ...................... | 345/156 |
| 2007/0230747 | A1 * | 10/2007 | Dunko .......................... | 382/107 |
| 2007/0268246 | A1 * | 11/2007 | Hyatt ............................ | 345/156 |
| 2008/0168403 | A1 * | 7/2008 | Westerman et al. .......... | 715/863 |
| 2008/0309508 | A1 * | 12/2008 | Harmon ..................... | 340/686.1 |
| 2009/0051648 | A1 * | 2/2009 | Shamaie et al. ............. | 345/156 |
| 2009/0252308 | A1 * | 10/2009 | Arsenault et al. .......... | 379/93.01 |
| 2009/0328101 | A1 * | 12/2009 | Suomela et al. ................ | 725/40 |
| 2010/0033299 | A1 * | 2/2010 | Davis ............................ | 340/5.1 |

FOREIGN PATENT DOCUMENTS

CN 1585431 A 2/2005

* cited by examiner

*Primary Examiner* — Nathan Mitchell
*Assistant Examiner* — Dung Lam
(74) *Attorney, Agent, or Firm* — Birch, Stewart, Kolasch & Birch, LLP

(57) ABSTRACT

A device and method of controlling a portable terminal including a motion sensor and a manipulation unit. The method includes a) sensing a motion pattern of the portable terminal; b) receiving a manual manipulation of the manipulation unit from a user; and c) interpreting a value inputted from the manipulation unit and a motion pattern sensed by the motion sensing unit as a user instruction.

26 Claims, 26 Drawing Sheets

[ SIDE KEY ]

[ GYRO KEY ]

[ PARTICULAR IMAGE AREA ]

[ CALL KEY ]
K1

[ PARTICULAR IMAGE AREA ]

[ A LITTLE TILTING ]

[ SHAKING ]

[ MOTION RECOGNITION ]

[ SHAKING STRENGTH ]

[ TILTING DEGREE/DIRECTION ]

[ MOTION PATTERN/DEGREE ]
(COME AND GO MOTION PATTERN/DEGREE)

[ SHAKING GRADUALLY INCREASES SELECTED IMAGE ]

PORTABLE TERMINAL AND DRIVING METHOD OF THE SAME

CROSS-REFERENCE TO RELATED APPLICATION

The present application is based on, and claims priority from, Korean Patent Application Number 10-2008-0080504, filed Aug. 18, 2008, the disclosure of which is incorporated by reference herein in its entirety.

BACKGROUND OF THE INVENTION

1. Field of the Invention

The present disclosure relates to a portable terminal installed therein with a gyro sensor.

2. Discussion of the Background

Typically, a portable terminal is a mobile device that has one or more functions such as performing of voice and video call communication, data input/output and data storage.

With such diverse functions, the portable terminal has evolved into a comprehensive multimedia device that can support various operations, such as capturing images or videos, reproducing music or video files, allowing the user to play games and receiving broadcast contents.

To realize complex instructions, some conventional devices are equipped with a motion detection sensor so that a user may give instructions via a motion commands. However, the conventional devices are deficient for many reasons, including requiring that users remember specific motion patterns relative to all the instructions as operation modes. Also, the conventional devices are deficient because unintentional motions of a user may generate an erroneous operation by the portable terminal.

SUMMARY OF THE INVENTION

The present disclosure solves the aforementioned drawbacks of the conventional art by providing a portable terminal and a driving method of the same capable of giving instructions by using a motion pattern coincident with an intuition of a user.

The present disclosure is related to a portable terminal and a driving method of the same capable of giving instructions using a motion pattern capable of avoiding confusion of motion patterns.

An objective of the present disclosure is to increase the number of instructions applicable to a motion pattern and to prevent an erroneous operation resultant from an unintentional motion pattern by analyzing the motion pattern using the motion pattern and an input from another manipulation device.

According to one general aspect of the present disclosure, there is provided a portable terminal including: a motion sensing unit for sensing a motion of the portable terminal; a manipulation unit for receiving a manual manipulation of a user; and a controller for interpreting a value inputted from the manipulation unit and a user instruction from a motion pattern sensed by the motion sensing unit.

Thus, there is an advantage in that the portable terminal can combine the input of the manipulation unit and the motion pattern to receive various cases of instructions from the user and to resultantly increase a user convenience and a user satisfaction.

According to another general aspect of the present disclosure, there is provided a driving method using a portable terminal, including: recognizing a motion of the portable terminal to check an input of a touch screen or a designated key button; interpreting a user instruction from a motion pattern comprised of motion detection values of the motion sensing unit during an input of the touch screen or the designated key button; and executing the user instruction.

Thus, there is an advantage in that the portable terminal executing the driving method can be applied to interpretation, as the user instruction, of only the motion pattern derived from motion values generated from an intentional touch of the touch screen or depressing of the designated key button to thereby prevent an erroneous operation by the motion sensing unit.

There is an advantageous effect in the portable terminal and the driving method of the same thus described in that user conveniences can be increased. For example, an instruction can be given using a motion pattern consistent with intuition of a user and the number of user instructions using the motion pattern can be increased. Furthermore, an erroneous operation of a portable terminal caused by unintentional motion under a portable environment can be avoided.

DETAILED DESCRIPTION OF THE INVENTION

Before describing the invention, certain terms employed in the specification, examples and appended claims are, for convenience, collected here.

The term 'mode' of a portable terminal relates to an operational mode of a portable terminal. Specifically, the term of 'mode' may relate to a state that the portable terminal enters and executes, or a state where the portable terminal is waiting for a user instruction or an event.

In most of cases, mutually different programs (e.g., applications) are loaded in mutually different 'modes'. However, a user may classify a call mode and a reception waiting mode just as a 'mode' and recognize them as such. The user may also consider a 'game' and an 'instant messenger' as an 'application' and recognizes these as such.

The term 'pattern' relates to 'shapes/designs that are repeated regularly'. Here, the 'shapes/designs' do not necessarily define visible shapes and designs but may represent shapes/designs relative to signal changes of particular parameters within a predetermined time interval.

The term 'motion pattern' in the present description not only defines a 'displacement pattern' explaining 'a pattern obtained by accumulating position changes of a reference point' of a portable terminal (e.g., a center weight point or an attachment position of a sensor) for a predetermined period of time, but also covers a concept having a broader meaning that includes all the information on motions, such as, but not limited thereto, rotational movements, rotational directions and degrees of inclinations relative to gravity directions or cardinal points.

In various embodiments of the invention, the portable terminal may be wirelessly connected to a computer device of a wireless communication network of a provider that provides communication services, and may be connected to an internet service providing server that provides various internet services via the wireless internet communication network.

The portable terminal described in the present disclosure may refer to a mobile phone, a smart phone, a notebook computer, a digital broadcasting terminal, a PDA (Personal Digital Assistance), a PMP (Portable Multimedia Player) and a GPS navigation device and the like.

Figure 1:
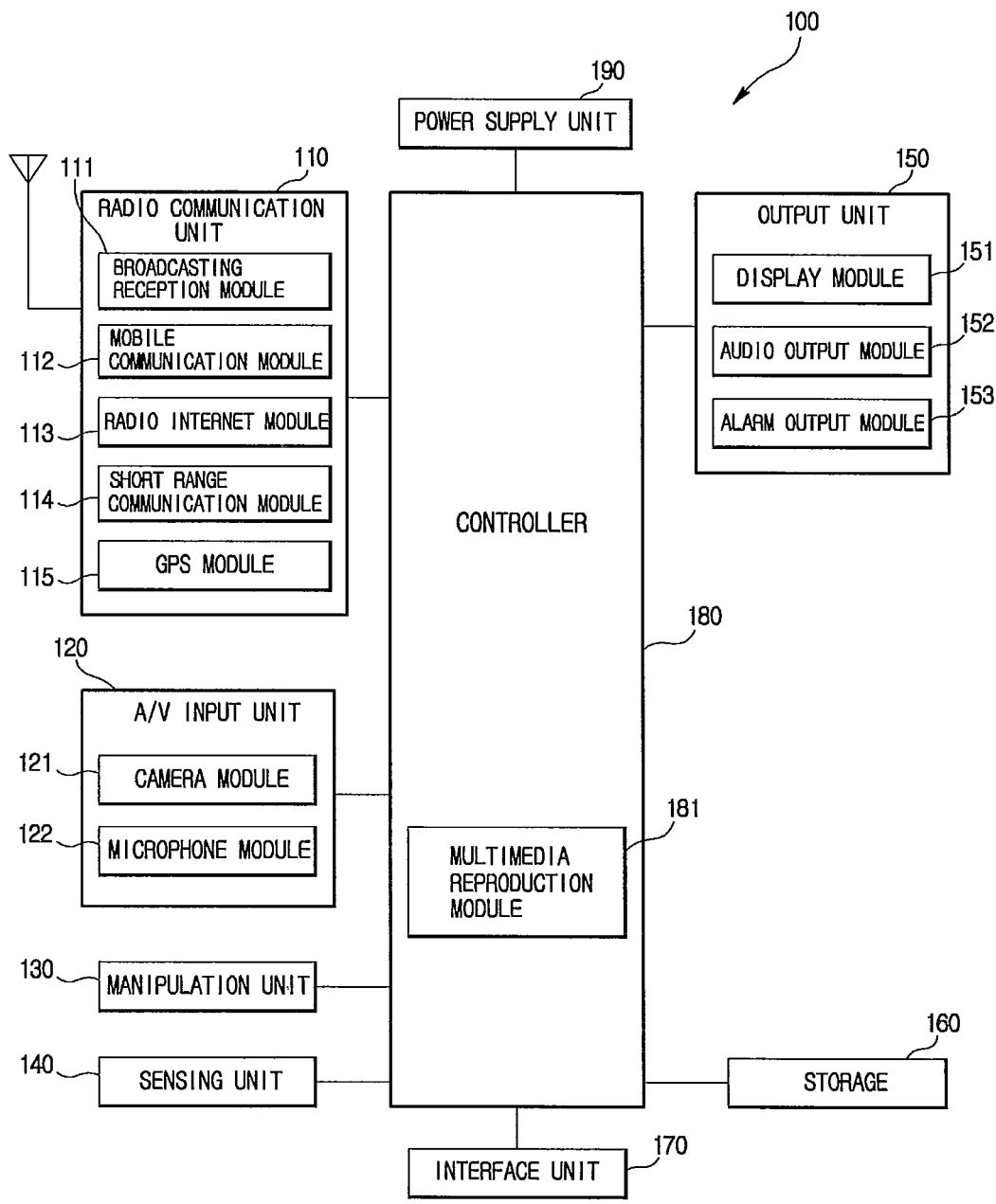
FIG. 1 is a block diagram of a portable terminal related to an exemplary implementation of the present disclosure and configured to execute one or more of the methods described below.

FIG. 1 is a block diagram of a portable terminal according to an exemplary implementation of the invention.

Referring to FIG. 1, the portable terminal 100 may include a wireless communication unit 110, an A/V (audio/Video) input unit 120, a manipulation unit 130, a sensing unit 140, an output unit 150, storage 160, an interface unit 170, a controller 180, a power supply unit 190, as well as other elements. It should be noted that two or more constituent elements may be combined in a single element, or a single element may be divided into two or more elements when in actual implementation.

Now, these constituent elements will be sequentially described in detail.

The radio communication unit 110 may include a broadcasting reception module 111, a mobile communication module 112, a wireless internet module 113, a short-range communication module 114 and a GPS module 115.

The broadcasting reception module 111 receives broadcasting signal and/or broadcasting related information from an external broadcasting management server (not shown) via a broadcasting channel. The broadcasting channel may include a satellite channel or a terrestrial channel or some other type of communication channel. The broadcasting management server may refer to a server that generates and transmits broadcasting signals and/or broadcasting associated information or a server that receives previously generated broadcasting signals and/or broadcasting associated information and transmits such to a terminal. The broadcasting associated information may refer to information related to a broadcasting channel, a broadcasting program or a broadcasting service provider. The broadcasting signal may include, not only a TV broadcasting signal, a radio broadcasting signal, a data broadcasting signal, but also a broadcasting signal obtained by combining a data broadcasting signal with a TV broadcasting signal or a radio broadcasting signal.

Meanwhile, the broadcasting associated signal may be provided via a mobile communication network, and in such a case, such information may be received by the mobile communication module 112.

The broadcasting associated information may be implemented in various formats. For example, the broadcasting associated information may include an EPG (Electronic Program Guide) of a DMB (Digital Multimedia Broadcasting) format, or an ESG (Electronic Service Guide) of a DVB-H (Digital Video Broadcasting-Handheld) format.

The broadcasting reception module 111 receives broadcasting signals by using various digital broadcasting techniques, and particularly, the digital broadcasting signals can be received by using digital broadcasting techniques, such as DMB-T (Digital Multimedia Broadcasting-Terrestrial), DMB-T (Digital Multimedia Broadcasting-Satellite), Media-FLO (Media Forward Link Only), DVB-H (Digital Video Broadcasting-Handheld) and ISDB-T (Integrated Services Digital Broadcasting-Terrestrial). It should be also noted that the broadcasting reception module 111 may be configured to be suitable for any other broadcasting technique that provides broadcasting signals and information.

The broadcasting signals and/or broadcasting associated information received via the broadcasting reception module 111 may be stored in the storage 160.

The mobile communication module 112 transmits and receives radio signals to and from at least one device out of a base station, an external terminal and a server of a mobile communication network. Here, the radio signals may include voice call signals, video (or conference) communication call signals, data in various formats based on the transmission and reception techniques used, text/multimedia messages and other types of information.

The radio internet module 113 refers to a module that supports a radio access to a network such as internet, and may be installed in the mobile terminal or may be implemented as an internal or external element.

The short range communication module 114 refers to a module that supports short range communications. Suitable technologies for implementing this module may include Bluetooth, RFID (Radio Frequency Identification), IrDA (Infrared Data Association), UWB (Ultra Wideband) and Zig-Bee. The GPS module 115 receives navigational information from a plurality of satellites.

Meanwhile, the A/V input unit 120 is configured to receive audio signals or video signals and may include a camera module 121 and a microphone module 122. The camera module 121 functions to process image frames such as motionless images or videos (moving images) that are obtained by an image sensor in a video call (or video conference) mode or in an image capture mode. The processed image frames may then be displayed on a display module 151.

The image frames processed by the camera module 121 may be stored in the storage 160 or transmitted to outside via the wireless communication unit 110. Two or more camera modules 121 may be provided according to configuration and aspects of the portable terminal.

The microphone module 122 receives an external sound signals from a microphone in a calling mode, a recording mode or a voice recognition mode and processes such into an electrical audio (voice) data. The processed audio data may be converted for output into a format that can be transmittable to a mobile communication base station via the mobile communication module 112 in a calling mode. The microphone module 122 may include various types of noise canceling algorithms (or other processing mechanisms) to cancel noise generated in the course of receiving the external audio signals.

The manipulation unit 130 may generate key input data based on user inputs to control the operation of the portable terminal. The manipulation unit 130 may be formed as a key pad, a dome switch, a touch pad (e.g., employing touch recognition techniques based on pressure, capacitance, resistance and the like), a jog wheel and a jog dial switch. Particularly, when the touch pad is combined with the display module (151 described later) in a layered structural manner, such may be called a touch screen.

The sensing unit 140 senses a current state (or configuration) of the portable terminal (i.e., an opened or closed state), a location (or orientation) of the portable terminal 100, or whether the user has touched certain portion of the portable terminal. Based on such sensing, a sensing signal for controlling the operation of the portable terminal 100 is generated.

For example, if the portable terminal is a slide-type portable terminal, the sensing unit 140 can sense whether a slide portion of the slide type portable terminal is opened or closed with respect to a main body portion of the portable terminal. In addition, the sensing unit 140 can perform a sensing function to detect whether the power supply unit 190 has supplied power or whether the interface unit 170 is connected with an external device.

The interface unit 170 functions to interface with various external devices that can be connected with the portable terminal 100. For example, the external devices may include a wired or wireless headset, an external charger, a wired or wireless data port, a card socket (i.e., for coupling a memory card and a SIM/UIM card), an audio input/output port, a video input/output port, and an earphone. The interface unit 170 may be used to receive data from the external device or be provided with power, such that the received data or power can be delivered to particular elements of the portable terminal 100 or may be used to transmit data and other information from the portable terminal 100 to the external device.

The output unit 150 is configured to provide various types of outputs such as audio signal, a video signal or an alarm signal and may include a display module 151, an audio output module 152 and an alarm output module 153.

The display module 151 serves to output and display information processed by the portable terminal 100. For example, the display module 151 may display a particular UI (User Interface) or GUI (Graphic User Interface) related to the call operation when the portable terminal 100 is in a calling mode. The display module 151 may display a captured and/or received image, or a particular UI and/or GUI when the portable terminal 100 is in a video calling mode or an image capturing mode.

As noted above, if the display module 151 and the touch pad are formed together in a layered manner to constitute a touch screen, the display module 151 may be used as an input device as well as an output device. The display module 151 may include at least one of a liquid crystal display, a thin film transistor-liquid crystal display, an organic light emitting diode, a flexible display and a three-dimensional (3D) display. The display module 151 may include two or more such displays according to particular implementation of the portable terminal 100. For example, the portable terminal 100 may be disposed with external display module (not shown) and internal display modules (not shown) at the same time.

The audio output module 152 may output audio data that has been received from the radio communication unit 110 in a call signal reception mode, a calling mode, a recording mode, a voice recognition mode or a broadcasting reception mode, or output audio data which has been stored in the storage 160. In addition, the audio output module 152 may output an audio signal related to a function (e.g., a call signal reception sound and a message reception sound) performed by the portable terminal 100. The audio output module 152 may include a speaker and a buzzer.

The alarm output module 153 may output a signal that informs about occurrence of an event of the portable terminal 100. The event occurring in the portable terminal 100 may be, for example, a call signal reception requesting a telephone call, a message reception, a key signal input and an alarm that informs a predetermined time. The alarm output module 153 outputs a signal informing about occurrence of an event in a different format other than an audio signal or a video signal. The alarm unit 153 may output a signal, for example, in the form of vibration. When a call signal or a message is received, the alarm output module 153 may output vibration in order to inform about the received call signal or message. Alternatively, when a key signal is received, the alarm unit 153 may output vibrations as a feedback of the inputted key signal. The user can recognize the occurrence of an event via the vibrations. Additionally or alternatively, the occurrence of an event may be informed to the user via the display module 151 and/or the audio output module 152.

The storage 160 may store software programs (or codes, instructions, etc.) used to support the processing and controlling performed by the controller 180 and may perform a function for temporarily storing inputted or outputted data (e.g., a phone book, a message, a still image, or video.).

The storage 160 may include a storage medium of at least one of a flash type memory, a hard disk type memory, a multimedia card, a card type memory (e.g., SD card, XD card, etc.), a RAM and a ROM, just to name a few. In addition, the portable terminal 100 may cooperate with a network storage device capable of performing the storage function of the storage 160 via network access (such as via the Internet).

The controller 180 controls the general operations of the portable terminal. For example, the controller 180 performs the controlling and processing associated with handling a voice call, data communication, a video call. In addition, the controller 180 may include a multimedia reproduction module 181 for reproducing multimedia data. The multimedia reproduction module 181 may be formed as a hardware component within the controller 180 or may be formed as a software component separately from the controller 180.

The controller 180 may identify a proximity touch or a direct touch of the touch screen by an object (for example, finger of a user) to change the size or area of a screen displayed on the touch screen. To this end, the controller 180 may be formed with a scroll bar or a mini map for controlling the size or area of a screen displayed on the touch screen. The detailed description of the controller 180 will be further given hereinafter.

The power supply 190 receives external power or internal power and supplies the power required for the operation of various elements under the control of the controller 180.

In the above description, the portable terminal according to the present inventive concept has been explained in terms of elements from the perspective of their functions. Hereinafter, the portable terminal according to the present novel concept will be explained in terms of the external elements with reference to FIGS. 2 and 3. For simplicity, a touch screen-type portable terminal among various types of portable terminals such as a folder type, a bar type, a swing type and a slider type will be referred to for explaining the exemplary implementations. However, it can be clearly understood that the features described herein are not limited to the touch screen-type portable terminal, but can be applicable to any type of portable terminal.

Figure 2:
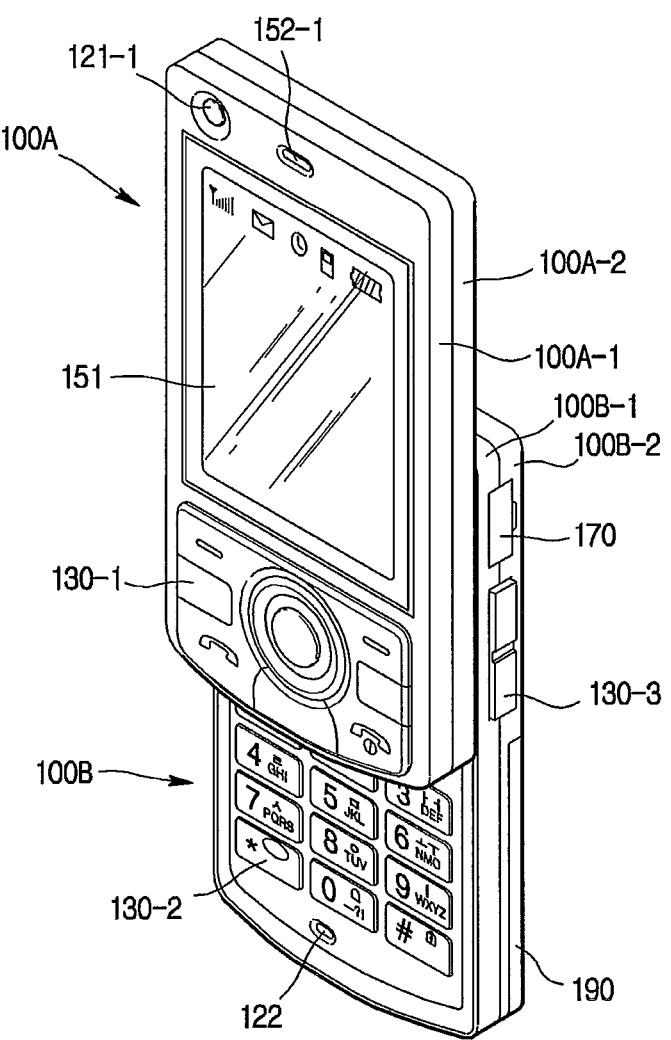
FIG. 2 is a front perspective view of a portable terminal according to an exemplary implementation of the present disclosure and configured to execute one or more of the methods described below.

FIG. 2 is a front perspective view of the mobile terminal according to one exemplary implementation of the invention. The methods described below may be implemented in other device configurations as well.

The portable terminal 100 includes a first body 100A and a second body 100B formed to be slidably moving along at least one direction on the first body 100A. In other implementations, the bodies may flip or rotate, or may share a common body.

A state in which the first body 100A is disposed to overlap with the second body 100B may be called a closed configuration, and as shown in FIG. 2, a state in which the first body 100A is moved to expose at least a portion of the second body 100B may be called an open configuration.

In the closed configuration, the portable terminal operates mainly in a standby mode, and the standby mode may be released according to a user manipulation. In the open configuration, the portable terminal operates mainly in the calling mode, and the operation state may be changed into the standby mode upon lapse of a certain time or according to user manipulation.

The case (a casing, a housing, a cover and the like) constituting an external appearance of the first body 100A consists of a first front case 100A-1 and a first rear case 100A-2, and various electronic components are installed in a space there between. At least one or more intermediate cases may be additionally disposed between the first front case 100A-1 and the first rear case 100A-2.

The cases may be formed by injection-molding of a synthetic resin or may be made of a metallic material, such as stainless steel (STS) or titanium (Ti). On the first body 100A {e.g.; substantially on the first front case (100A-1)}, the display module 151, the first audio output module 152-1, the first camera module 121-1 or a first manipulation unit 130-1 may be disposed.

The display module 151 includes an LCD (Liquid Crystal Display), an OLFD (Organic Light Emitting Diode), or the like that visually displays information.

A touch pad may be overlaid (overlapped, superimposed, covered) on the display module 151 in a layered manner to allow the display module 151 to operate as a touch screen, whereby the user may input information or commands (instructions) by touching the display module 151.

The first audio output module 152-1 may be implemented as a receiver or a speaker to output various types of sounds.

The first camera module 121-1 may be suitably implemented for capturing still images, moving images, videos, or other visual information.

The manipulation unit 130-1 receives user commands (instructions) for controlling network contents reproduction and travel guide operations.

Like the first body 100A, the case constituting the external appearance of the second body 100B consists of a second front case 100B-1 and a second rear case 100B-2.

A second manipulation unit 130-2 may be disposed on the second body 100B, specifically, on a front face portion of the second front case 100B-1.

A third manipulation unit 130-2, a microphone module 122, and an interface unit 170 may be disposed on at least one of the second front case 100B-1 or the second rear case 100B-2.

The first to third manipulation units 130-1, 130-2, 130-3 may be collectively referred to as the manipulation unit 130, and any means can be employed as the first to third manipulation 130-1, 130-2, 130-3 so long as it can be operated in a tactile manner.

For example, the manipulation unit 130 may be implemented by using one or more dome switches or touch pads that can receive a user command or information according to press or touch operation by the user, or may be implemented by using a mechanical manipulation means, such as a rotatable element (e.g., a wheel, dial, jog button, thumbwheel, etc.) or a linear movement element (e.g., a joystick, lever, knob, etc.).

In terms of functions thereof, the first manipulation unit 130-1 may comprise one or more function keys used for inputting a command such as start, end or scroll, and the second user input unit 130-2 may comprise one or more keypads used for inputting numbers, characters, and symbols.

The third manipulation unit 130-3 may be operated as a so-called hot key for activating a special function of the portable terminal.

The microphone module 122 may be suitably implemented for receiving a voice of the user or other sounds.

The interface unit 170 may be used as a passage (path or link) that allows data to be exchanged with an external device through a wired or wireless medium. For example, the interface unit 170 may be at least one of a connection port used for connection of an ear jack, earphones, and the like, a communication port that supports short-range communications (e.g., an IrDA port, a Bluetooth.™ port, a wireless LAN port, etc.), and a power supply port used for supplying power to the portable terminal.

The interface unit 170 may include a card socket for receiving or accommodating a card-like medium, such as a SIM (Subscriber Identification Module) card, a UIM (User Identity Module) card and a memory card for storing information.

The power supply unit 190 may be mounted at the side (or edge) portion of the second rear case 100B-2 for use in supplying power to the portable terminal 100. The power supply unit 190 may be a rechargeable battery, which can be releasably and attachably formed with the portable terminal.

Figure 3:
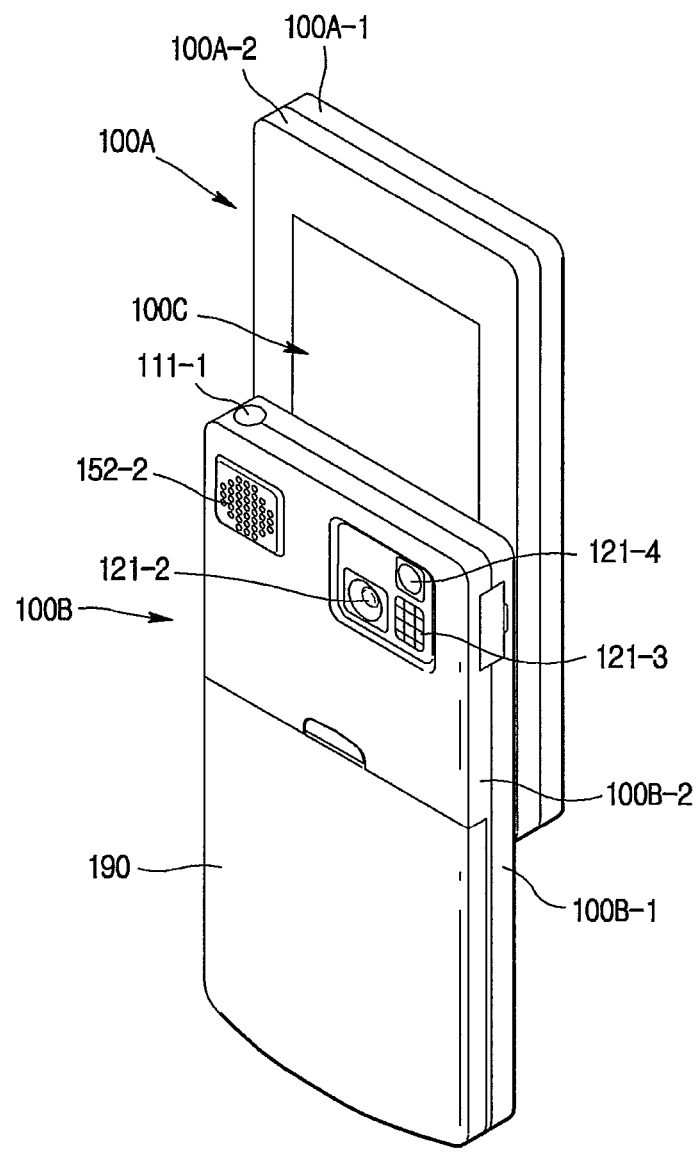
FIG. 3 is a rear perspective view of a portable terminal of FIG. 2.

FIG. 3 is a rear perspective view of the portable terminal according to one exemplary implementation.

Referring to FIG. 3, a second camera module 121-2 may be additionally mounted on the rear surface of the second rear case 100B-2 of the second body 100B. The second camera module 121-2 may have an image capture direction which is substantially opposite to that of the first camera module 121-1 (See FIG. 1), and may support a different number of pixels when compared to the first camera module 121-1.

For example, preferably, the first camera module 121-1 is used for low resolution (i.e., supporting a relatively small number of pixels) to quickly capture an image (or video) of the user's face for immediate transmission to another party during video conferencing or the like, while the second camera module 121-2 is used for high resolution (i.e., supporting a relatively large number of pixels) in order to capture more detailed (higher quality) images or video which typically do not need to be transmitted immediately.

A flash 121-3 and a mirror 121-4 may be adjacently disposed at the second camera module 121-2. When an image of a subject is captured by the second camera module 121-2, the flash 150 illuminates the subject. The mirror 121-4 allows the user to see himself or herself when he or she wants to capture his or her own image (i.e. perform self-image capturing) by using the second camera module 121-2.

A second audio output module 152-2 may be additionally disposed on the second rear case 100B-2, and may implement a stereophonic function in conjunction with the first audio output module 152-1 (See FIG. 2), and may be also used in a speaker phone mode for call communication.

A broadcasting signal reception antenna 111-1 may be disposed at one side of the second rear case 100B-2, in addition to an antenna used for call communication. The antenna 111-1 may be installed such that it can be extended from the second body 100B.

One part of a slide module 100C that slidably connects the first body 100A with the second body 100B may be disposed on the first rear case 100A-2 of the first body 100A. The other part of the slide module 100C may be disposed on the second front case 100B-1 of the second body 100B, which may not be exposed to the outside as shown in FIG. 3.

In the above description, the second camera module 121-2 and the like are disposed on the second body 100B, but such exemplary configuration is not meant to be limiting.

For example, one or more of the constituent elements 111-1, 121-2, 121-3, 152-2 which are disposed on the second rear case 100B-2 may be mounted on the first body 100A, mainly, on the first rear case 100A-2. In this case, there is an advantage in that those elements disposed on the first rear case 100A-2 can be protectively covered by the second body 100B in the closed configuration. In addition, even if a second camera module 121-2 is not separately mounted, the first camera module 121-1 may be configured to rotate to thereby enable an image capturing up to an image capturing direction of the second camera module 121-2.

Figure 4:
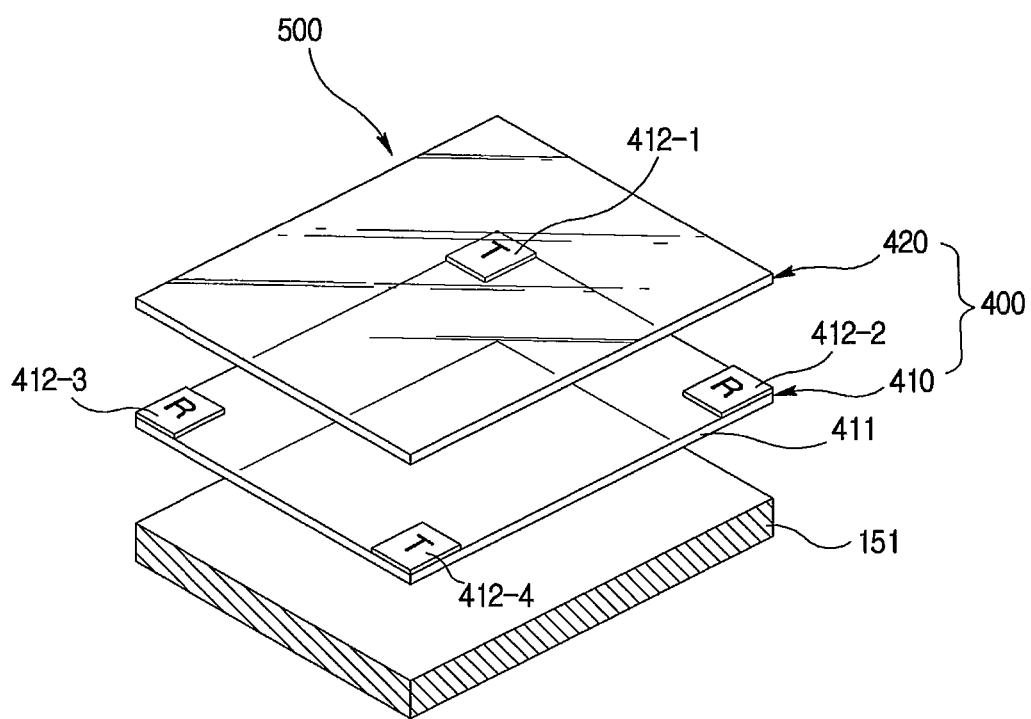
FIG. 4 is a schematic view illustrating a structure of a touch screen according to one embodiment of the invention.

FIG. 4 is a schematic view illustrating a structure of a touch screen related to the present disclosure.

Referring to FIG. 4, the display module 151 may be overlaid (overlapped, superimposed, covered) on the touch pad 400 in a layered manner to allow operating as a touch screen.

The touch pad 400 illustrated in FIG. 4 is comprised of a squared conduction film 411 made of transparent conductive material such as ITO (Indium Tin Oxide) and metal electrodes 412-1 to 412-4 each formed at edge of each conductive film 411. The conductive film 411 may be formed thereon with a protective film 420.

The touch pad 400, a position detection device of capacitive sensing type, is formed with electric field lines between transmission side metal electrodes (T: 412-1, 412-4) and reception side metal electrodes (R: 412-2, 412-3) by an AC (alternating current) voltage applied to the transmission side metal electrodes (T: 412-1, 412-4). The formed electric field lines are extended to the outside of the touch pad 400 via the protective film 420.

As a result, when an object (for example, digits of a user) comes near to the touch pad 400 or directly touches the touch pad 400, the electric field lines are partially interrupted to generate a change on the phase and size of the current flowing to the reception side metal electrodes (R: 412-2, 412-3). This is because human body has a static capacity of several pFs relative to the ground to distort the electric field lines formed on the touch pad 400 when a user brings a finger near to or touches the touch pad 400.

Processes (not shown) formed inside the portable terminal 100 may use the current change of the reception side metal electrodes (R: 412-2, 412-3) in response to the touch operation of the object to detect a distance neared by the object and a position where the touch has occurred.

In addition, the object may include not only the finger of the user, but also all the objects capable of identifying the touch input by the portable terminal 100, by distorting the electric field lines formed on the touch pad 400.

Figure 5:
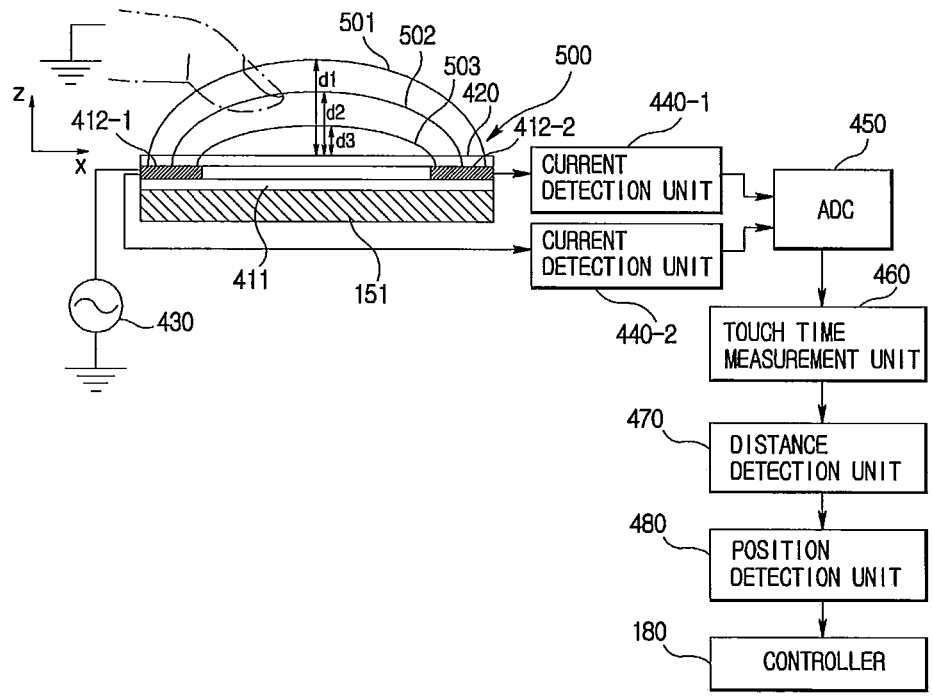
FIG. 5 is a schematic view illustrating a principle for detecting a proximity distance of an object using the touch screen of FIG. 4 according to one embodiment of the invention.

FIG. 5 is a schematic view illustrating a principle for detecting a proximity distance of an object using the touch screen of FIG. 4.

Referring to FIG. 5, application of AC voltage 430 to the transmission side metal electrode 412-1 out of metal electrodes 412-1 to 412-4 formed on the transparent conductive film 411 makes it possible to form electric field lines (i.e., electric lines of force. 501 to 503 between the transmission side metal electrode 412-1 and the reception side metal electrode 412-2. The electric field lines 501 to 503 may be extensively formed to a vertical upward direction (i.e., z direction) of the touch screen 500.

The amount of electric field lines 501 to 503 interrupted by a finger 510 may be changed base on the proximity distance to the touch screen 500 neared by the finger 510 of the user. In other words, as the hand 510 nears the touch screen 500, the finger 510 may increase the influence applied to the electric field lines 501 to 503.

As noted above, the influence applied to the electric field lines 501 to 503 by the finger 510 changes the current applied to current detection units 440-1, 440-2 connected to the metal electrodes 412-1, 412-2, where the current detection units 440-1, 440-2 detect the changed current and provide the change to an ADC (Analog-to-Digital Converter. 450). The ADC 450 converts the current amount inputted in the form of analog signal to a digital value and provides the digital value to a touch time measurement unit 460.

The touch time measurement unit 460 measures a time stayed by the finger 510 within a touch identification (recognition) effective distance (i.e., 'd1' of FIG. 5) capable of identifying proximity of the finger 510 by the touch screen 500 from the information relative to the changed current amount provided by the ADC 450. In doing so, the touch time measurement unit 460 may recognize that the proximity touch or direct touch operation is being performed if the finger 510 stays beyond a predetermined time (i.e., 1 second) within the proximity touch identification effective distance (i.e., 'd1' of FIG. 5). Meanwhile, if the finger 510 stays shorter than a predetermined time (i.e., 1 second) within the proximity touch identification effective distance (i.e., 'd1' of FIG. 5), the touch time measurement unit 460 may determine that the proximity touch or direct touch operation is not being performed.

If it is determined that there is a touch input in response to the proximity touch or direct touch operation relative to the touch screen 500, the touch time measurement unit 460 may provide to a distance detection unit 470 information on touch input generation information and current change amount.

The distance detection unit 460 may calculate a distance between the finger 510 and the touch screen 500, i.e., a distance separated from the touch screen 500 by the finger 510 toward the vertical upward direction (i.e., z direction) from the information on the provided current change amount.

To be more specific, if the finger 510 is positioned at a location nearer than d1 from the vertical direction of the touch pad 400 (i.e., z direction) but further than d2 (i.e., 20 mm, a location between d1 and d2), the distance detection unit 460 may determine that the finger 510 has entered within the touch identification effective distance from which to detect whether the touch screen 500 starts to be touched by an external object, and may provide a function corresponding to the proximity touch operation. The proximity touch is defined by a state of an object (i.e., finger of a user) being positioned within the touch identification effective distance of the touch screen 500 for inputting a user command. The proximity touch of the object not directly touching the touch screen 500 may be distinguished from the direct touch operation that directly touches the touch screen 500 by the object.

Furthermore, if the finger 510 is positioned on a location nearer than d2 (i.e., 20 mm) from the vertical direction of the touch pad 400 (i.e., z direction) but further than d3 (i.e., 10 mm, a location between d2 and d3), the distance detection unit 460 may determine that the finger 510 has fairly approached the touch screen 500. If the finger 510 is positioned on a location shorter than d3 (i.e., 10 mm) (i.e., positioned within d3) from the vertical direction of the touch pad 400 (i.e., z direction) (i.e., positioned within d3) or the finger 510 has directly touched the surface of the touch screen 500, the distance detection unit 460 may determine that the finger 510 has directly touched the touch screen 500 within the error scope.

Although the touch operation of the finger 510 has been described in three steps according to the distance between the finger 510 and the touch screen 500, the description of the touch operation may be classified to four steps for further accuracy.

Successively, a position detection unit 480 may calculate from information on the changed current amount a position on the touch screen 500 indicated by the finger 510, i.e., a horizontal coordinate of x and y direction on the touch screen 500. The y direction is a vertical direction relative to x and z directions illustrated in FIG. 5.

The measured vertical distance discrete between the finger 510 and the touch screen 500 and the horizontal coordinate of the finger 510 on the touch pad 400 may be transmitted to the controller 180. In so doing, the controller 180 may check the user command according to the vertical distance and the horizontal coordinate to perform a control operation in response to the user command and concurrently provide a predetermined graphic user interface (GUI).

Figure 6:
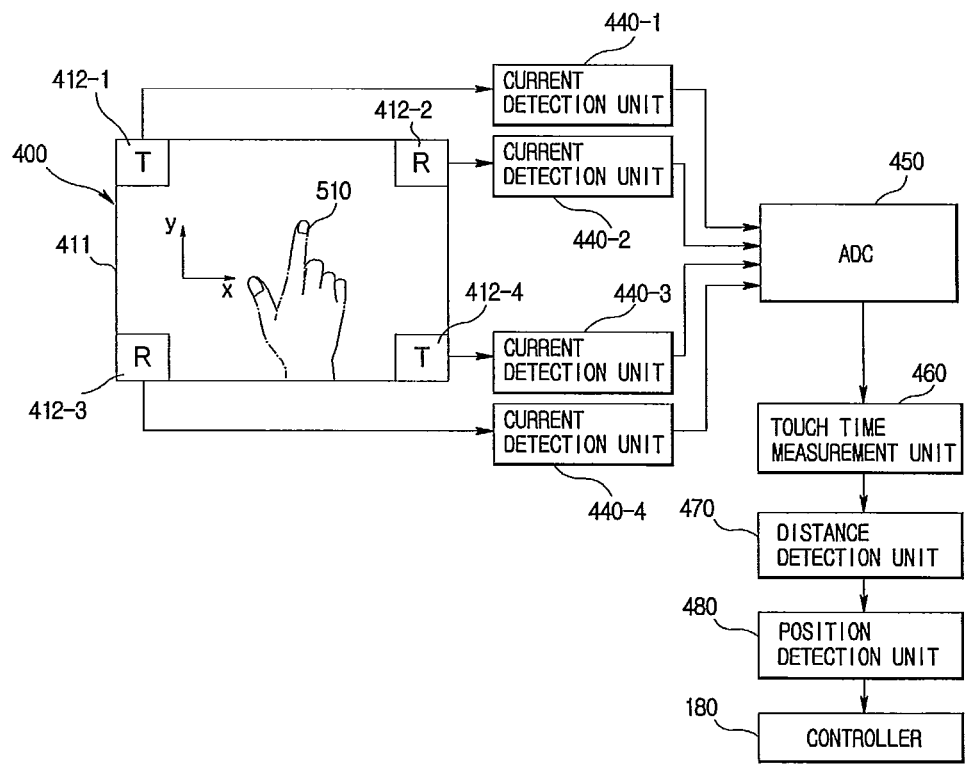
FIG. 6 is a schematic view illustrating a position detection principle of an object using the touch screen of FIG. 4 according to one embodiment of the invention.

FIG. 6 is a schematic view illustrating a position detection principle of an object using the touch screen of FIG. 4.

Referring to FIG. 6, when an AC voltage is applied from the AC voltage source to the transmission side metal electrodes 412-1, 412-4 of the touch panel 400, electric field lines (not shown) are formed between transmission side metal electrodes 412-1, 412-4 and the reception side metal electrode 412-2, 412-3.

In addition, if the finger 510 comes near onto the touch panel 400 or directly touches the touch panel 400, current changes are generated to the metal electrodes 412-1 to 412-4. The current detection units 440-1 to 440-4 measure the current changes, and as described above, the position detection unit 470 detects the horizontal coordinate (i.e., x-y coordinate) located on the touch panel 400 by the finger 510 via the current changes and provides the coordinate to the controller 180. The controller 180 now may recognize the horizontal coordinate on the touch screen 500 touched by the finger 510 to perform the user command corresponding to the touch operation and provide the predetermined graphic user interface (GUI) onto the display module 151.

Although FIGS. 5 and 6 has described the touch time measurement unit 460, the distance detection unit 460 and the position detection unit 480 separately according to their functions, these units 460, 470, 480 may be formed inside the controller 180.

Although the touch screen 500 equipped with the touch panel 400 according to capacitance detection type has been exemplified in FIGS. 4, 5 and 6 to explain the principle of determining the proximity touch and direct touch of object relative to the touch screen 500, there is no limit of arrangement shapes of the metal electrodes 412-1 to 412-4 of the touch panel 400 or the kinds of touch panel 400 as long as the function is provided for detecting the position indicated by the object and the distance between the object and the touch screen 500.

For example, the touch panel 400 may be embodied to detect a proximity position between the object and the touch panel 400 using a photoelectric sensor that uses laser diodes and light emitting diodes, a high frequency oscillation proximity sensor and electromagnetic proximity sensor. The touch panel may also be embodied by combining the capacitance detection type and the resistive sensing type by forming metal electrodes on an upper plate or a lower plate for detecting voltage changes according to a position pressed by the object.

Exemplary Implementation

Now, functions of constituent elements for embodying the idea of the present disclosure out of constituent elements of FIG. 1 and embodiment measures will be emphatically described.

The sensing unit 140 of the portable terminal according to the present exemplary implementation may be equipped with a motion detector, such as a gyro sensor or the like for detecting motion of the portable terminal.

The manipulation unit 130 may be equipped with a key pad disposed with a plurality of key buttons, and may be formed with a touch screen for detecting a coordinate value of a point designated by a user. In some exemplary implementations, other pointing-receiving devices replacing the touch screen may be used, but the touch screen may be the most appropriate pointing-receiving device in the present exemplary implementation in view of the fact that a user applies a shaking operation to the portable terminal while the touch screen is being touched.

The controller 180 may interpret a value received from the manipulation unit 130 and a motion pattern detected by the motion detector as a user instruction. Preferably, the controller 180 determines a motion pattern from detection values of the motion detector during a period (e.g., during a period of a particular key button being depressed, or a period of a touch screen being depressed) in which a value received from the manipulation unit 130 keeps a predetermined value.

The motion detector may be embodied by a three-axis acceleration sensor, which may be selected from various products on the market in consideration of an appropriate size suitable for installation in a portable terminal and performances.

The known method for calculating a displacement in pattern (hereinafter referred to as displacement pattern) using the three-axis acceleration sensor is disclosed in various ways, such that detailed explanation thereto will be omitted herein. But a principle of calculating the displacement pattern using the three-axis acceleration sensor will be explained in the following simple manner. That is, in consideration of the fact that an integral value of an acceleration becomes a speed, and an integral value of the speed becomes a distance that is moved, a displacement pattern of an object installed with the three-axis acceleration sensor can be obtained from accumulation of the acceleration values relative to orthogonal three axes, if a stopped point is known.

In some exemplary implementations, the motion detector is a two-axis acceleration sensor which is less expensive than the three-axis acceleration sensor, or a gyro sensor of other methods. The motion detector may further include a one-axis, two-axis or three-axis rotation detection sensor for sensing the rotating motion. The motion detector may calculate three-axis acceleration values for knowing a gravity direction, or may further include a gravity detection sensor.

In some exemplary implementations, the motion detector may output detection values in various types. For example, the motion detector may output a displacement pattern of a portable terminal, or may simply output three-axis acceleration values. The type of output may be determined by complexity of displacement pattern to be applied for inputting an instruction. Embodiment of using the displacement pattern is preferred, when various kinds of instructions are involved and displacement patterns are complex, and embodiment of three-axis acceleration output values is preferred, when the number of instructions is limited and displacement patterns are simple.

In some exemplary implementations, the controller 180 may refer to directivity of the motion pattern recognized by the motion detector in order to determine directivity of vibration pattern. This is to allow a user to determine directivity of vibration pattern in response to a holding state of a portable terminal, whereby the user can have the same feeling relative to the vibration pattern regardless of the directivity of the potable terminal held by the user. To this end, the vibration generator is preferred to be disposed with two or more vibration elements each having a different vibration direction (preferably orthogonal direction).

When the vibration generator is disposed with two or more vibration elements each having a different vibration direction, the vibration direction of motion pattern applied by a user and vibration direction applied by the vibration generator may be correlated.

For example, when a user holds a portable terminal in a lengthwise direction, and an instruction to a particular application is selectively given in a lengthwise vibration direction or a cross-wise vibration direction of the portable terminal, it is assumed that a user has selected the lengthwise vibration direction. At this time, an affirmative response to the user instruction may be embodied by generation of a length-wise vibration direction applied by the user, and a negative response to the user instruction may be embodied by generation of a cross-wise vibration direction which is the opposite direction. To this end, it is preferable that the storage 160 of the portable terminal be disposed with an area for recording a vibration direction of motion pattern applied by the user.

Preferably, the controller 180 may apply an approximate value in determining motion patterns because each of the motion patterns (albeit identically recognized by the user) may differ a bit according to user's psychological state. For example, a pattern within a predetermined approximate value from a recorded pattern may be considered as the recorded pattern.

The controller 180 may use one or more parameters selected from a group consisting of displacement, speed, acceleration speed, direction, rotation direction and the parameters are obtained from detection values of the motion detector, One or more of these parameters are used for interpreting motion patterns. The motion patterns recognized by the controller 180 may be divided into reciprocation motion, circular motion, hit or push as instantaneous acceleration, rotation and complex pattern motion (e.g., 8-shaped motion and zigzag motion).

A predetermined area allocated to the storage 160 of the portable terminal of FIG. 1 may be stored with data (e.g., DB) for supporting the driving method of the portable terminal.

For example, the storage 160 may be equipped with a motion pattern-instruction DB in which one field is allocated for an identifier of a particular key of depressed state or touch screen (partial or entire area), another field is allocated for motion pattern and still another field is allocated for interpreted instruction. The DB serves to assist the controller 180 in interpreting the user instruction from motion pattern during an input value designated by the manipulation unit 130.

Figure 7:
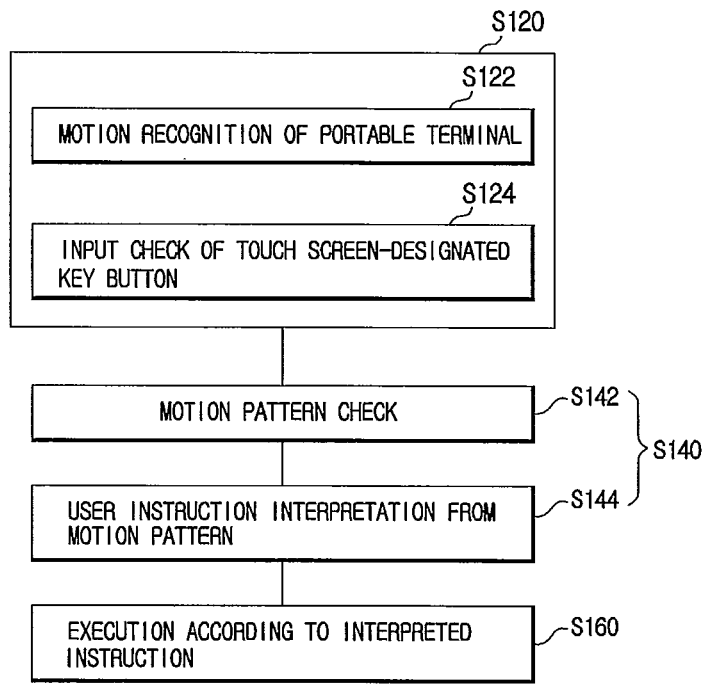
FIG. 7 is a flowchart illustrating a driving method of a portable terminal according to one embodiment of the invention.

FIG. 7 is a flowchart illustrating a driving method of a portable terminal according to an exemplary implementation of the present disclosure.

The driving method using a portable terminal illustrated in FIG. 7 comprises: recognizing a motion of the portable terminal to check an input of a touch screen or a designated key button (S120); interpreting a user instruction from a motion pattern comprised of motion detection values of the motion sensing unit while there is an input of the touch screen or the designated key button (S140); and executing the user instruction (S160).

The step of S120 may comprise: recognizing motion detection values from the motion detector of the portable terminal (S122); and monitoring, by the controller of the portable terminal, whether the touch screen or a particularly designated key has been depressed (S124). The steps of S122 and S124 may be performed simultaneously, or one of the two steps (S122 and S124) may be performed before the other step, or the other step may be performed after the first step.

Figure 9A:
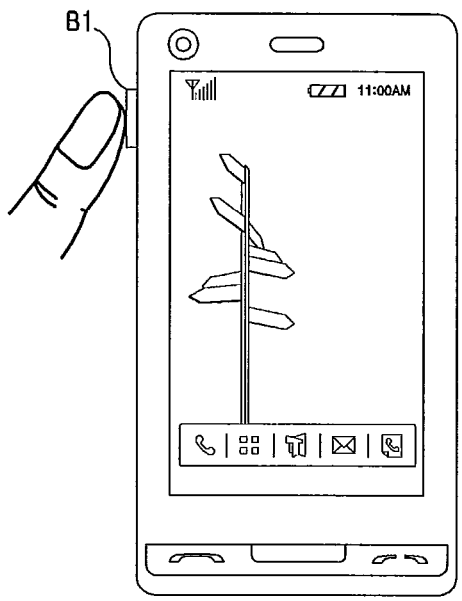
FIGS. 9a to 9e are conceptual drawings illustrating various keys applicable to a manual input f according to one embodiment of the invention.
Figure 9B:
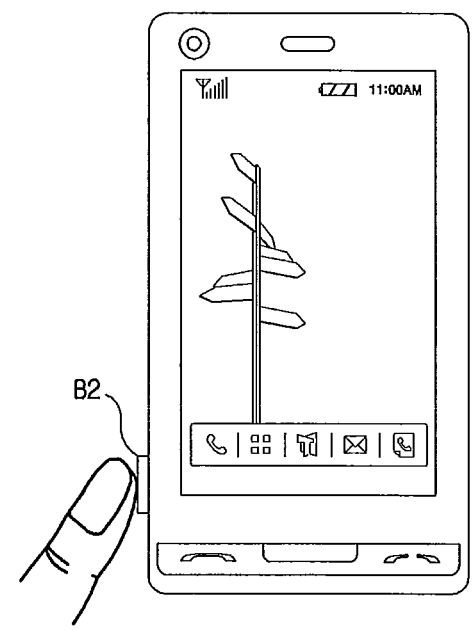
Figure 9C:
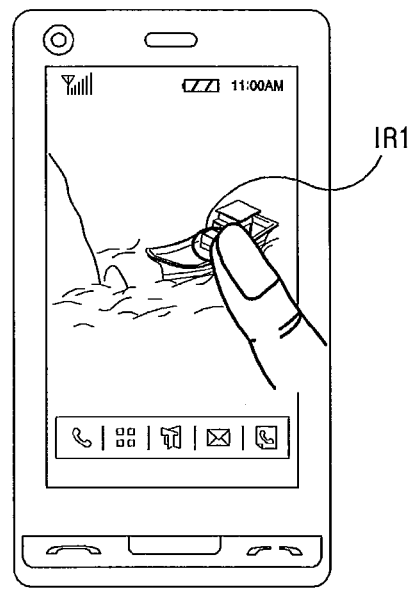
Figure 9D:
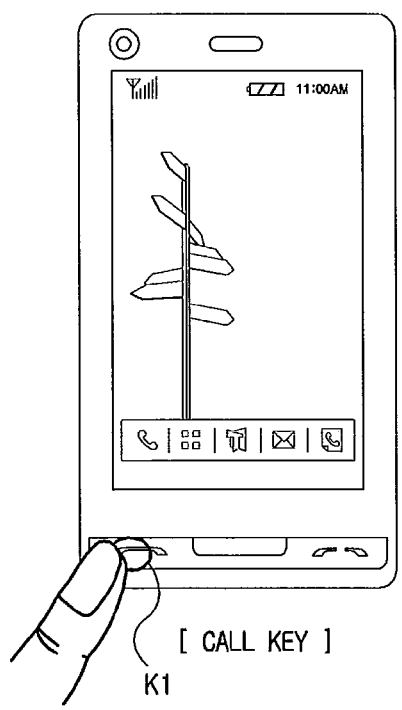
Figure 9E:
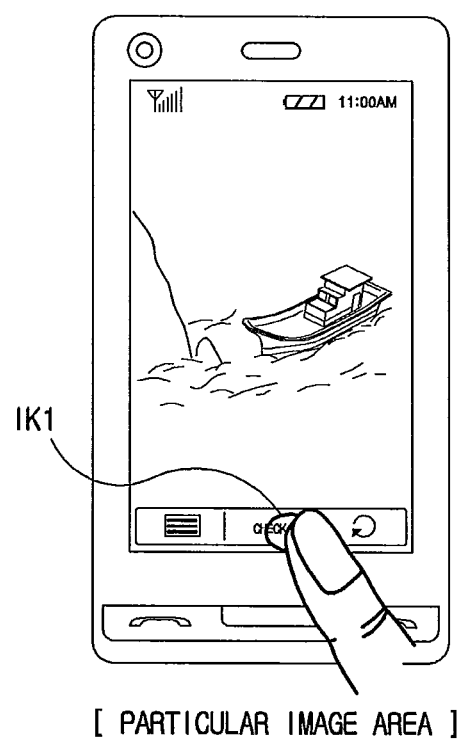

The constituent element of manipulation unit 130 for monitoring whether the touch screen or the particularly designated key has been depressed in step S124 may be a key (hereinafter referred to as side key) button (B1) positioned at a side of the portable terminal as illustrated in FIG. 9a, a particular key (hereinafter referred to as gyro key) button (B2) allocated for function setup of the gyro sensor as illustrated in FIG. 9b, a specific partial area (IR1) on the touch screen as illustrated in FIG. 9c, a call/termination key button (K1) as illustrated in FIG. 9d, or may be a software key button (IK1) formed at the touch screen as illustrated in FIG. 9e.

As a result of step S120, motion detection values may be obtained that have been accumulated in the period when the touch screen of the portable terminal or the particularly designated key button being depressed. The step of S140 may comprise: checking the motion pattern (S142); and interpreting an instruction from the motion pattern (S144).

The controller of the portable terminal in step S142 may detect motion patterns from the accumulated motion detection values. For example, three-axis acceleration values obtained at a predetermined interval may be integrated to obtain three-axis speed values, which is further integrated to obtain three-axis displacement values. Changes of the three-axis displacement values would allow directly determining the shapes of the motion patterns.

In some exemplary implementations, the displacement pattern of a portable terminal may be applied as the motion pattern, or the three-axis acceleration values may be simply applied as the motion pattern. A complex exemplary implementation may include a motion pattern added by directions and whether rotation has been effected.

When kinds of instructions to be applied are in large numbers, an embodiment of complex displacement pattern is preferred, and when the kinds of instructions are in small numbers, an embodiment of using a simple value such as two/three-axis acceleration output values is preferred. A simple push motion may be represented by a two-axis acceleration sensing value, and a motion tilting to a predetermined direction may be given by three-axis acceleration value.

Figure 10A:
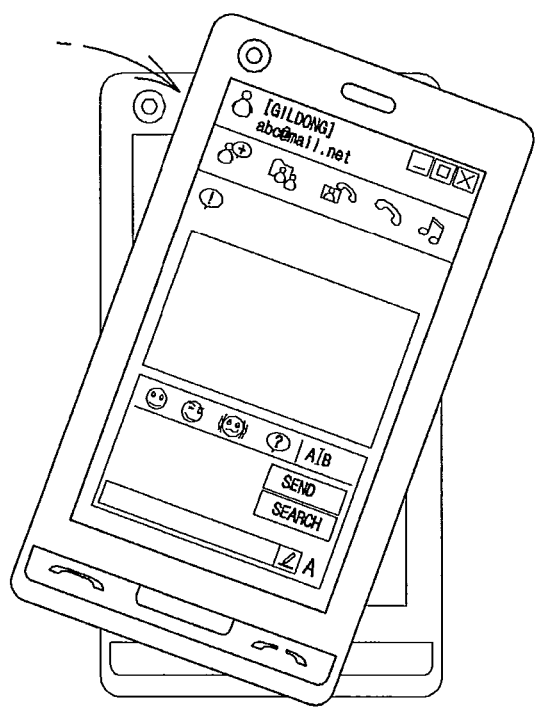
FIGS. 10a to 10d are conceptual drawings illustrating kinds of motion patterns according to one embodiment of the invention.
Figure 10B:
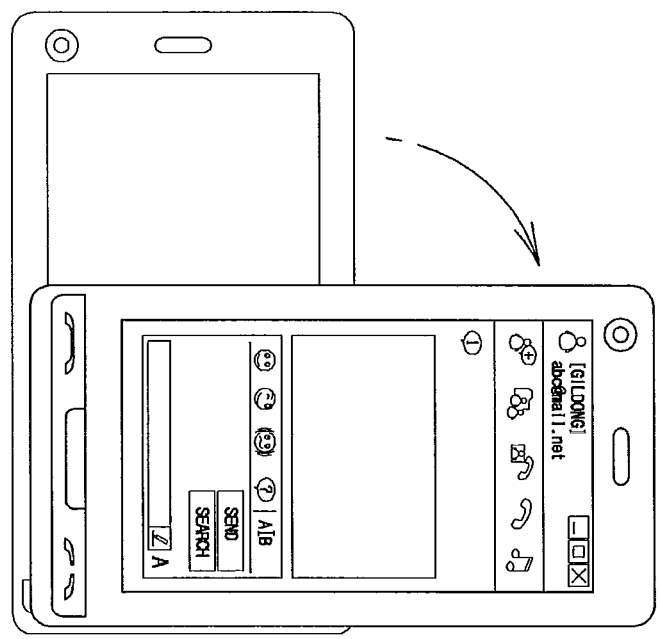
Figure 10C:
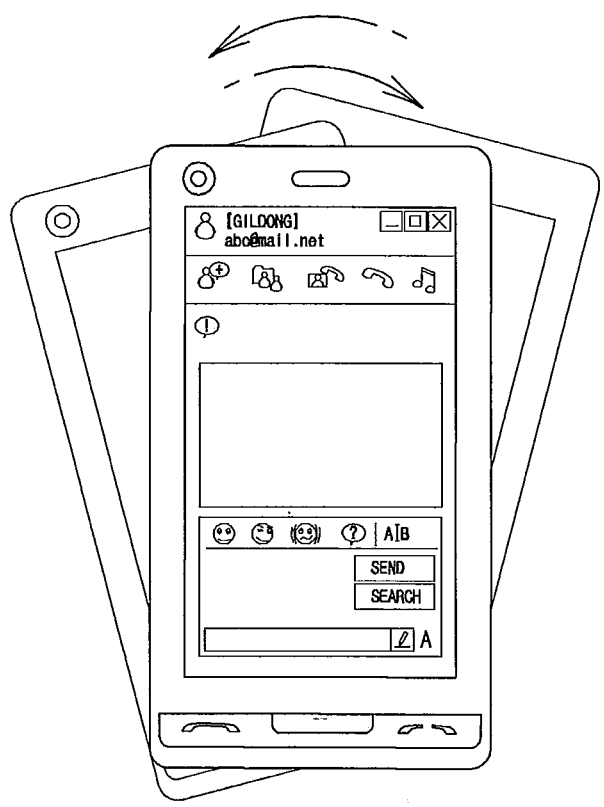
Figure 10D:
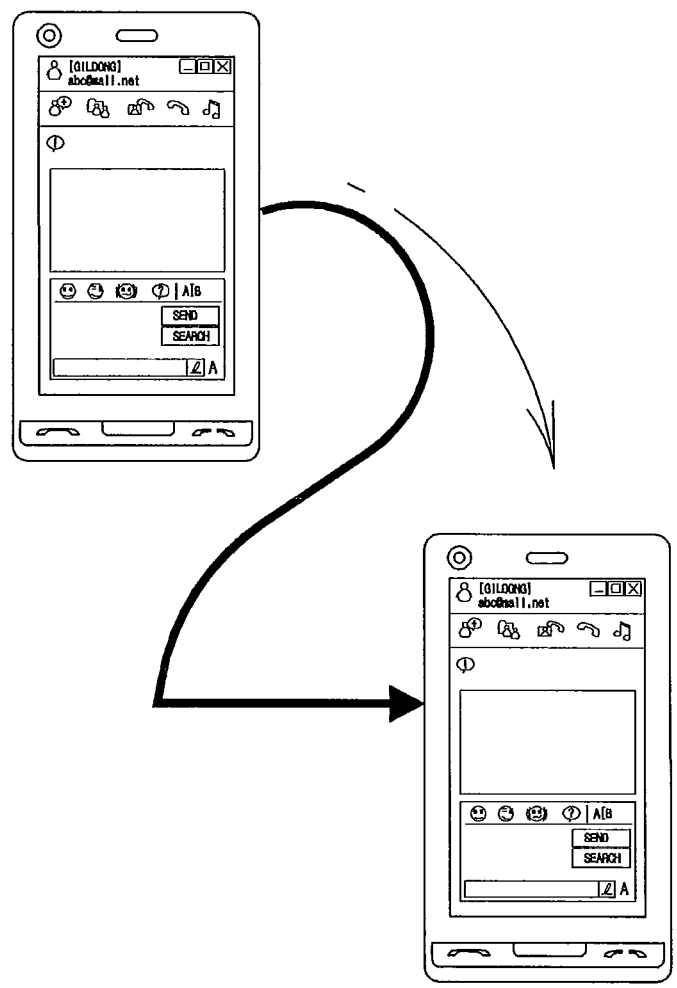

FIGS. 10a to 10d are conceptual drawings illustrating concrete motion shapes of a portable terminal applicable as motion patterns according to the idea of the present disclosure. As illustrated in FIGS. 10a to 10d, kinds of motion patterns may include a tilting (FIG. 10a), a 90-degree rotation (FIG. 10b), a shaking (FIG. 10c), a complex motion followed by a push (FIG. 10d).

Figure 11A:
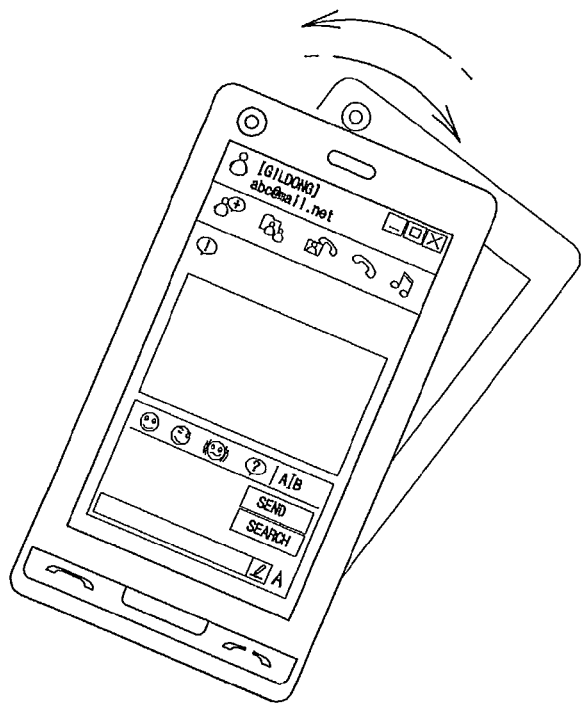
FIGS. 11a to 11c are conceptual drawings illustrating elements applicable as parameters of motion patterns according to one embodiment of the invention.
Figure 11B:
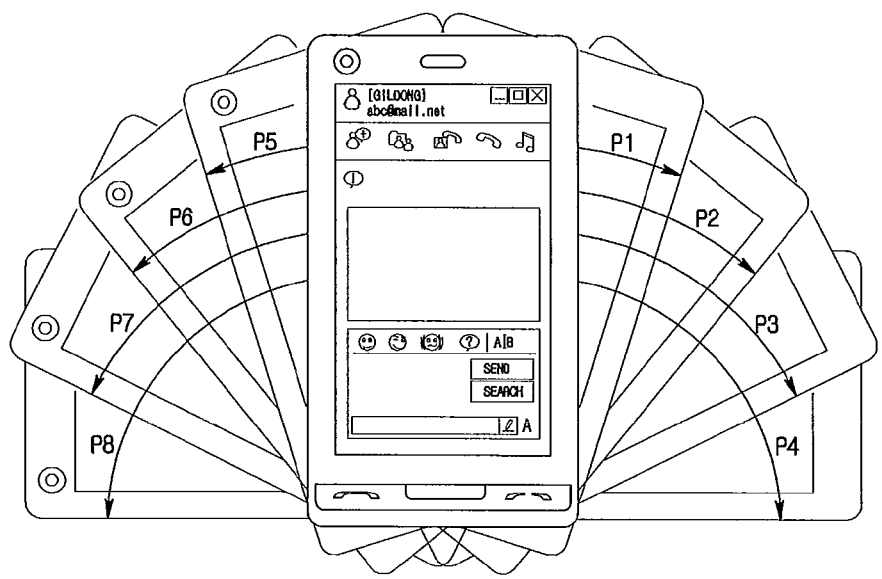
Figure 11C:
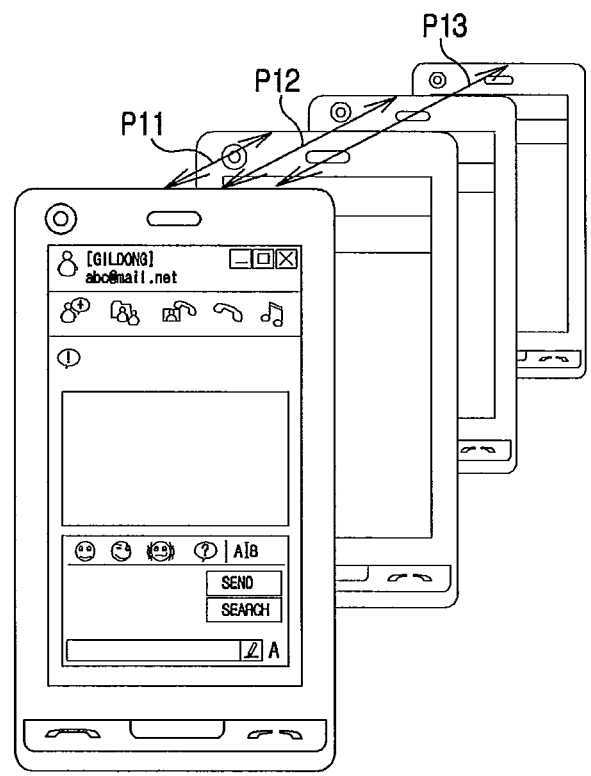

Meanwhile, parameters discerning each motion pattern may include strength of shaking as illustrated in FIG. 11a, degree and/or direction of tilting as illustrated in FIG. 11b (i.e., each motion of P1~P8 shown in FIG. 11c may be discernable each other), size of motion as shown in FIG. 11c (i.e., each width of motion in P1~P13 of FIG. 11c may be discernable each other), and concrete shapes of motions.

In step S144 of FIG. 7, in order to determine a user instruction represented by motion pattern detected from step S144, a motion pattern-instruction DB may be used. The DB is comprised of one field for an identifier of a particular key or touch screen (partial or entire area) is depressed, another field for a motion pattern, and still another field for an instruction.

In step S160, the controller 180 may perform in a form of executing an application or a task. Performance of a particular task within an operational system or an application program of a central processing unit in computer equipment is well known, such that the detailed explanation thereto will be omitted. The driving method of a portable terminal in FIG. 7 may be performed during various menu executions, and applied to various operation modes or applications.

A user in the present exemplary implementation may control an operation of the portable terminal by applying two kinds of inputs. The two kinds of inputs include a first input via a manual manipulation unit operated by a motion of a user using a finger, and a second input via a motion detector (gyro sensor) detecting a motion pattern applied to the portable terminal.

Methods for applying the two kinds of inputs may include a method simultaneously applying the first input and the second input, a method sequentially applying the first input and the second input within a relatively short waiting time, and a method partially overlapping a time of the first input being applied with a time of the second input being applied.

Among the three methods, the method of simultaneously applying the first input and the second input is preferable in terms of user convenience (e.g., when a user applies a shaking operation with a particular key button being depressed) and in order to prevent an erroneous or unintended operation caused by detecting a motion pattern by the portable terminal. However, it should be noted that the three methods are all useable for embodying the idea of the present disclosure, and are within the scope of the present disclosure.

Figure 8:
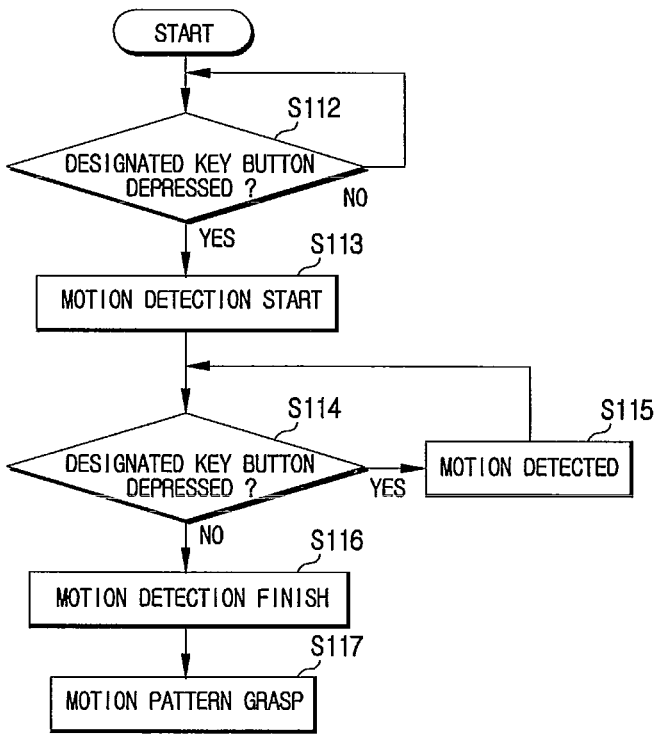
FIG. 8 is a flowchart illustrating a method of determining a motion pattern during a designated manual input according to one embodiment of the invention.

FIG. 8 is a flowchart of a process of a portable terminal detecting a motion pattern that is applied during depression of a designated key button by a user. The portable terminal checks the motion pattern based on motion values detected for a period from a time of the designated key button being depressed to a time of the designated key button being released. The motion values may be periodically obtained using the gyro sensor.

If the above-mentioned process is applied to the flowchart of FIG. 7, the step of S120 of FIG. 7 may include checking the depression of the designated key button (S112), starting to detect the motion using the gyro sensor when the depression of the designated key button is generated (S113), and checking the release of the designated key button in the course of motion detection (S114) and terminating the motion detection if the designated key button is released (S116). Meanwhile, a process (S115) of repeating the motion detection during depression of the designated key button may be repeated in a form of limitless loop. The method ends when the motion pattern is actually detected (S117).

When the motion detection is finished, the motion pattern is discriminated using the motion values obtained during depression of the designated key button (S142). The step of S142 in FIG. 8 corresponds to the step of S142 of FIG. 7. The discrimination of motion patterns from the periodic acceleration sensing values is known to the skilled in the art such that detailed explanation thereto will be omitted.

In some implementations, the depression of the designated key button may be replaced by touch of touch screen or touch of a particular area (e.g., soft key) on the touch screen.

Now, various cases of driving method in FIG. 7 will be described with reference to drawings illustrating a display screen of the portable terminal.

Figure 12:
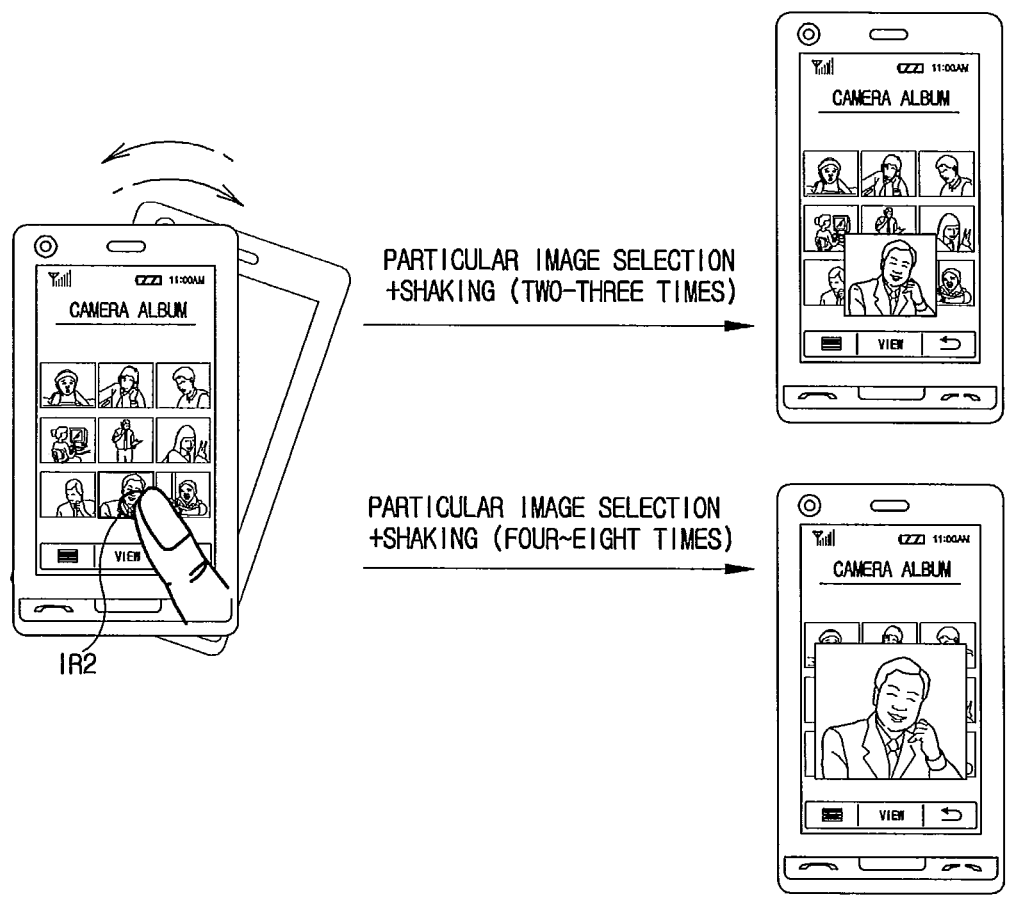
FIG. 12 is a display screen flowchart according to one embodiment of the invention and applied with an idea of the present disclosure to a content view screen relative to image files.

FIG. 12 illustrates a case of enlarging a touched file when a shaking motion is applied during touch by a user of a desired image of the portable terminal equipped with a touch screen. The desired image is on a file list viewed in form of thumbnail list.

An enlargement ratio of a touched file image may be determined by shaking times (frequency) during depression of a desired image (IR2) as shown in the drawing. Furthermore, it may be also possible to enter into a touched file view mode if applied with the shaking motion during touch of the desired image.

Figure 13:
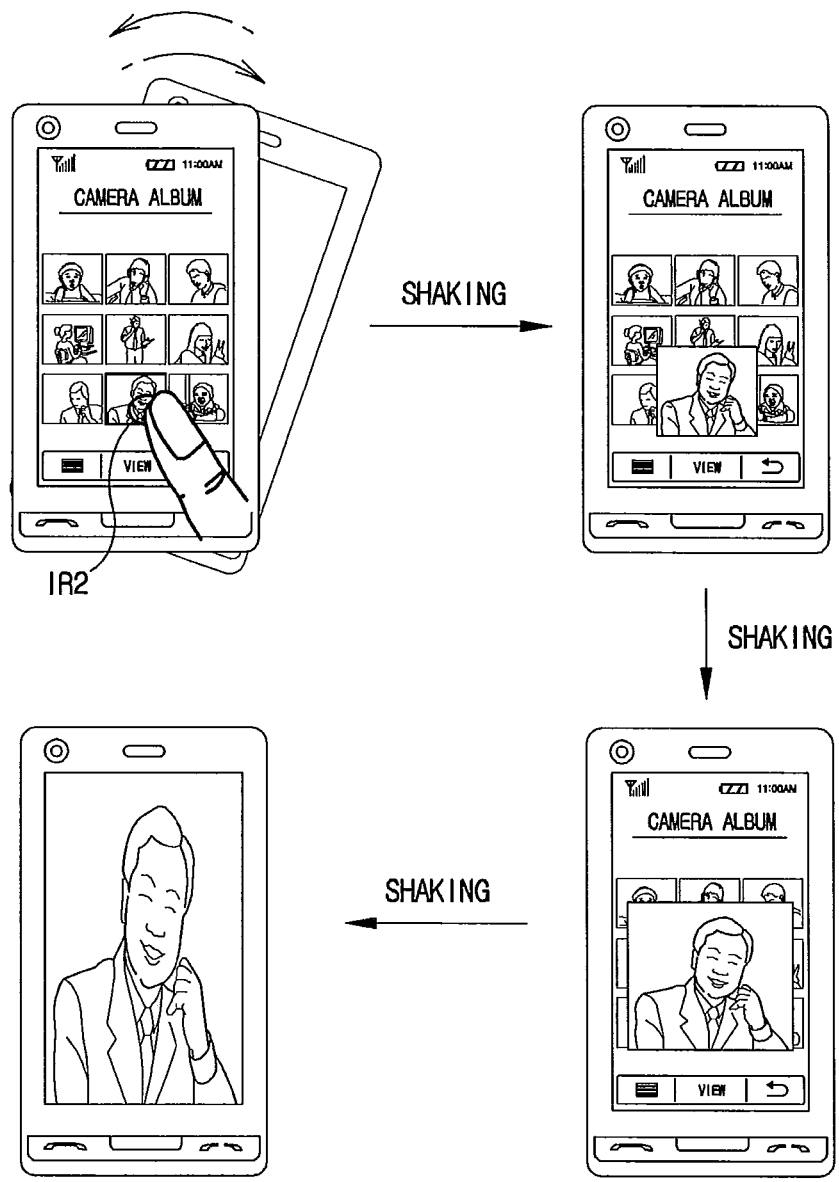
FIG. 13 is a display screen flowchart according to one embodiment of the invention and applied with an idea of the present disclosure to a content view screen relative to image files.

Alternatively, as illustrated in FIG. 13, it may be possible to continuously enlarge an interested image whenever the shaking motion is applied after a particular image (IR2) is selected as the interested image by the depressing motion on the touch screen, and it may be also possible to finally change an entire area of the interested image into a display mode as the shaking motion continues.

The thumbnailed image file list is easy to touch and is adequate to realize the above-mentioned ways. However, an image file list arranged in lengthwise format or a message list may also be applied to the present implementation.

Figure 14:
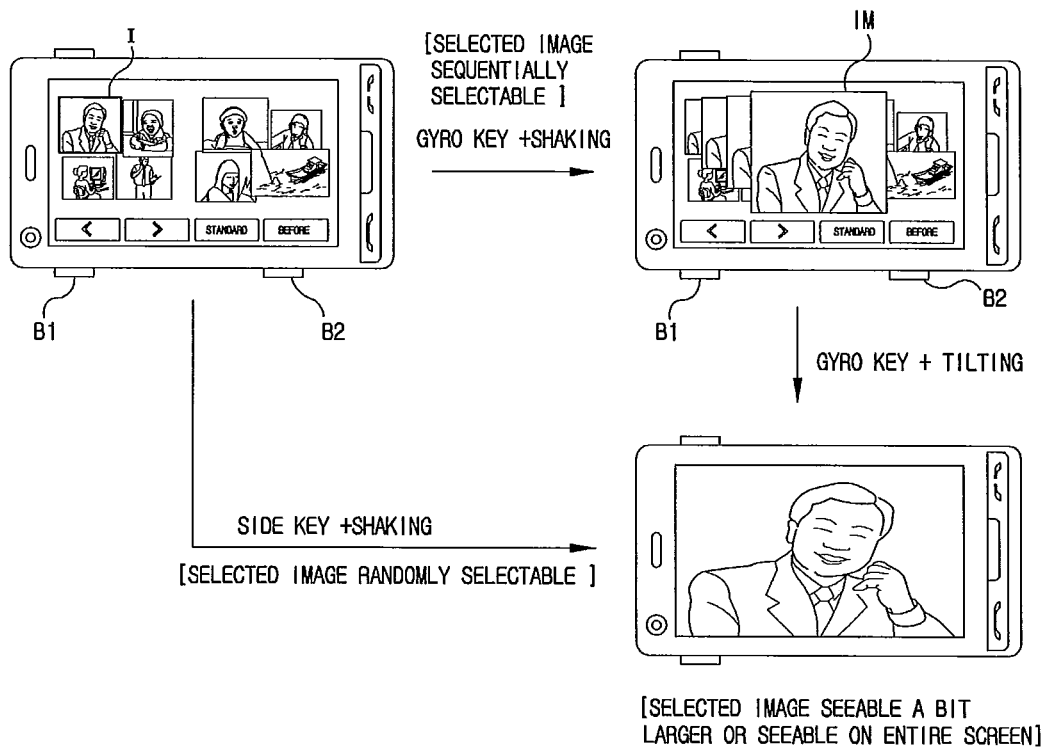
FIG. 14 is a display screen flowchart illustrating according to one embodiment of the invention and including a content view screen relative to image files.

FIG. 14 illustrates an instance where a single image is selected and displayed when a portable terminal is shaken in a mode of a particular key button being depressed by a user and image files being displayed in a thumbnail or a similar format.

The illustrated thumbnail screen is applied with a design allocated to a different size of area relative to each image in order to increase aesthetic feeling of a user.

Referring to FIG. 14, a normal thumbnail list is displayed on the screen. And a first combination of a particular key button and a particular motion pattern {gyro key (B2)+shaking on the drawing} is applied, an interested image (I, an image to be displayed on an entire screen by a selective operation to be followed) is enlarged larger than other images of thumbnail format, and a second combination of another particular key button and a particular motion pattern {gyro key (B2)+tilting on the drawing} is applied under this circumstance, the enlarged interested image (IM) is displayed on the entire screen.

Meanwhile, when the normal thumbnail list is displayed on the screen, and a third combination of a particular key button and a particular motion pattern {side key (B1)+shaking on the drawing} is applied, the interested image (I) is displayed on the entire screen.

The first, second and third combination may be discriminated by allocation of a different key button that is depressed, and/or by application of a different motion pattern.

In some exemplary implementations, when the first combination of a particular key button and a particular motion pattern {gyro key (B2)+shaking on the drawing} is applied, any one image on the thumbnail may be randomly set up as a desired image.

In some exemplary implementations, an operation of touching one image among a plurality of thumbnailed images displayed on the touch screen may replace the operation of depressing the particular key button. In this case, the touched image is preferably set up as the desired image.

Figure 15:
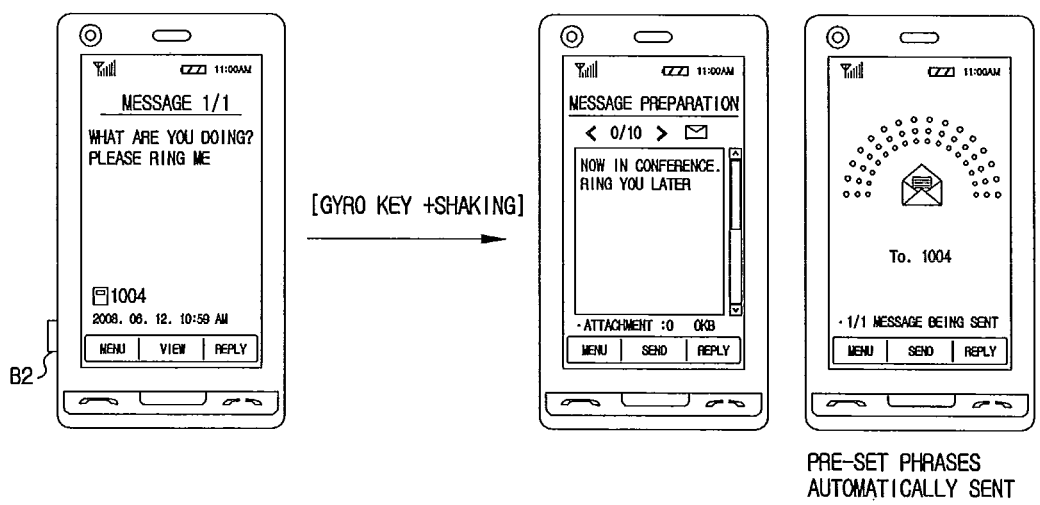
FIG. 15 is a display screen flowchart according to one embodiment of the invention and relating to a message check mode.

FIG. 15 illustrates an instance where a message of pre-designated content is transmitted to a sender of the message when a user depresses a particular key button to shake a portable terminal and to check the received message.

Referring to FIG. 15, when there is no time by the user who has checked the message to prepare a reply message to a relevant message, and when the user shakes the portable terminal during depression of the gyro key button (B2), the user can send a reply message of a pre-designated commonly used words or phases.

The illustrated exemplary implementation has a practical advantage because an excuse can be easily obtained from a message sender without generating a noise when a user requests a silence.

Alternatively, when a user shakes the portable terminal during depression of the particular key button and a call comes in under an awkward environment, the on-going call may be terminated and a predetermined message may be displayed to the user and/or may be transmitted to the caller who has just dialed up.

Figure 16A:
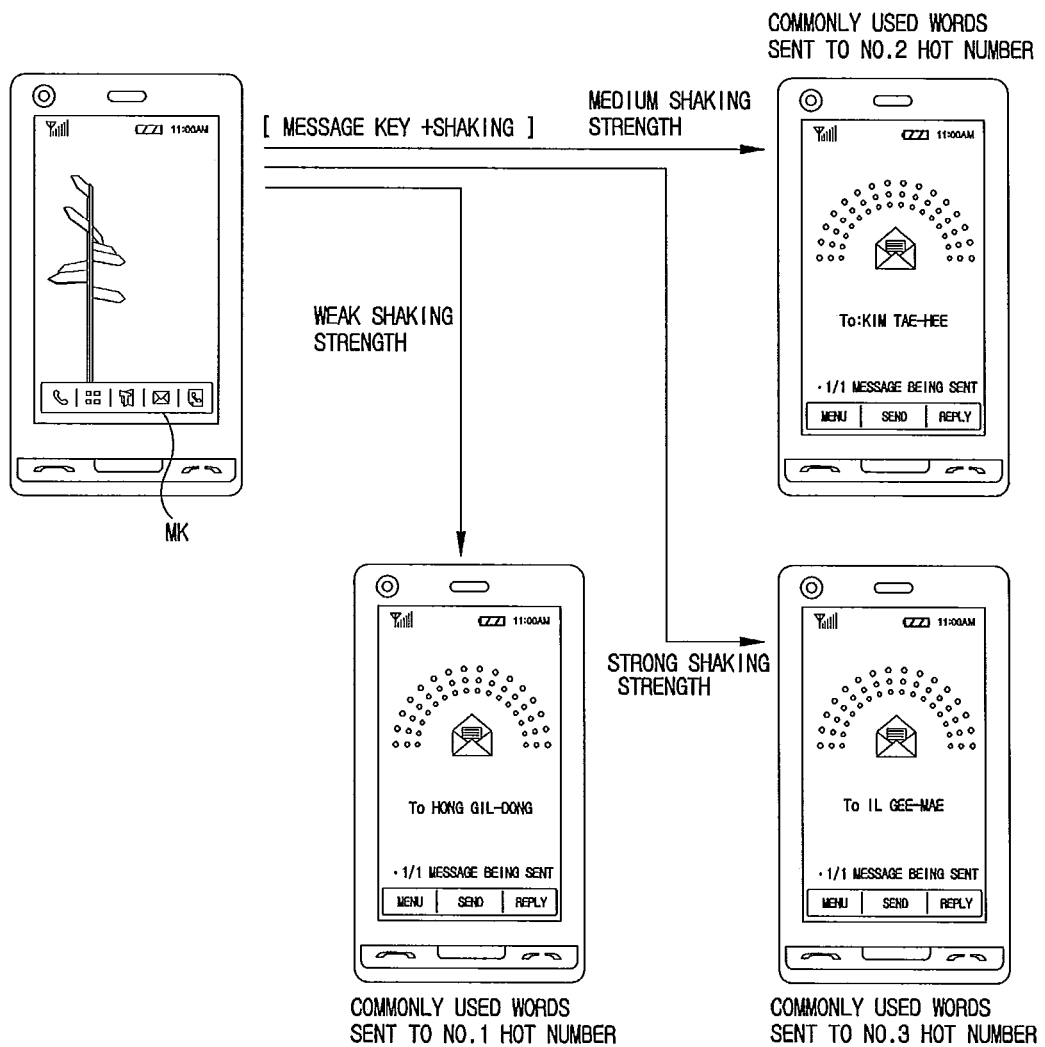
FIGS. 16a and 16b are display screen flowcharts according to one embodiment of the invention and relating to a function transmitting messages using a hot-key in a reception waiting mode.

FIG. 16*a* illustrates an scenario where a message including commonly used words is transmitted to a telephone number registered in hot number when a user shakes a portable terminal in a mode of a message key button (MK) being depressed in the conventional reception waiting mode.

Figure 16B:
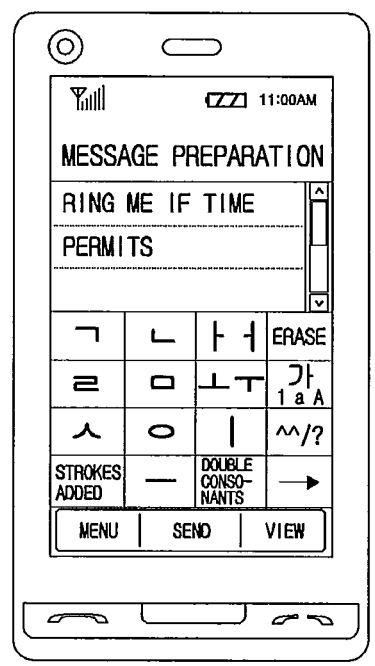

Referring to FIG. 16*a*, when a user depresses the message key button (MK) to shake the portable terminal, the portable terminal may select a desired phone number among a plurality of stored phone numbers and send a message in response to a motion pattern. As illustrated, strength of the shaking or the shaking times (frequency) may be applied as parameters of motion patterns that determine the hot number. As shown in FIG. 16*b*, the message may be one of a commonly-used word list, or a message specially registered for this method. In another embodiment, a first shake or series of shakes may result in a first predetermined word/phrase presented to the user to confirm before sending. If the first predetermined word/phrase is not desired, the user can reveal another predetermined word/phrase by again shaking/controlling the device.

Alternatively, when the portable terminal is in the conventional reception waiting mode, and a user shakes the portable terminal during depression of a message key button, it may be possible to enter into a mode for preparing a message to be sent to the telephone number registered in hot number.

Figure 17:
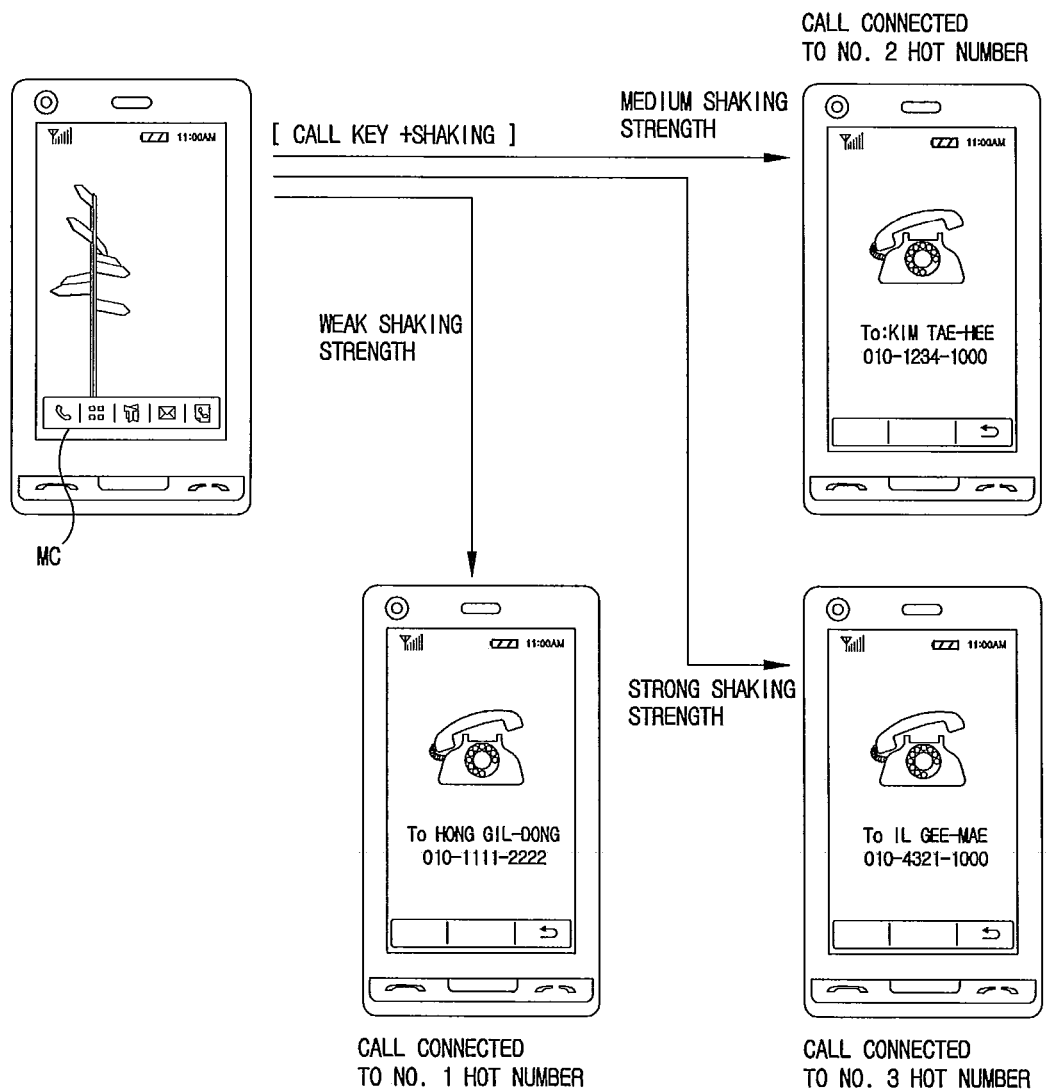
FIG. 17 is a display screen flowchart according to one embodiment of the invention and relating to a function connecting a communication via a hot-key in a reception waiting mode.

FIG. 17 illustrates an instance where a call connection is tried to a telephone number registered in hot number when a user shakes a portable terminal during depression of a call key button in the conventional reception waiting mode of the portable terminal.

Referring to FIG. 17, when a user shakes the portable terminal during depression of the call key button, the portable terminal may select a desired number among a plurality of hot numbers and try the call connection in response to a motion pattern. The strength of the shaking or the shaking times (frequency) may be used as parameters of motion patterns that determine the hot number. In another embodiment, a first shake or series of shakes may result in a first hot number presented to the user to confirm before sending. If the first hot number is not desired, the user can reveal another hot number by again shaking/controlling the device.

Figure 18:
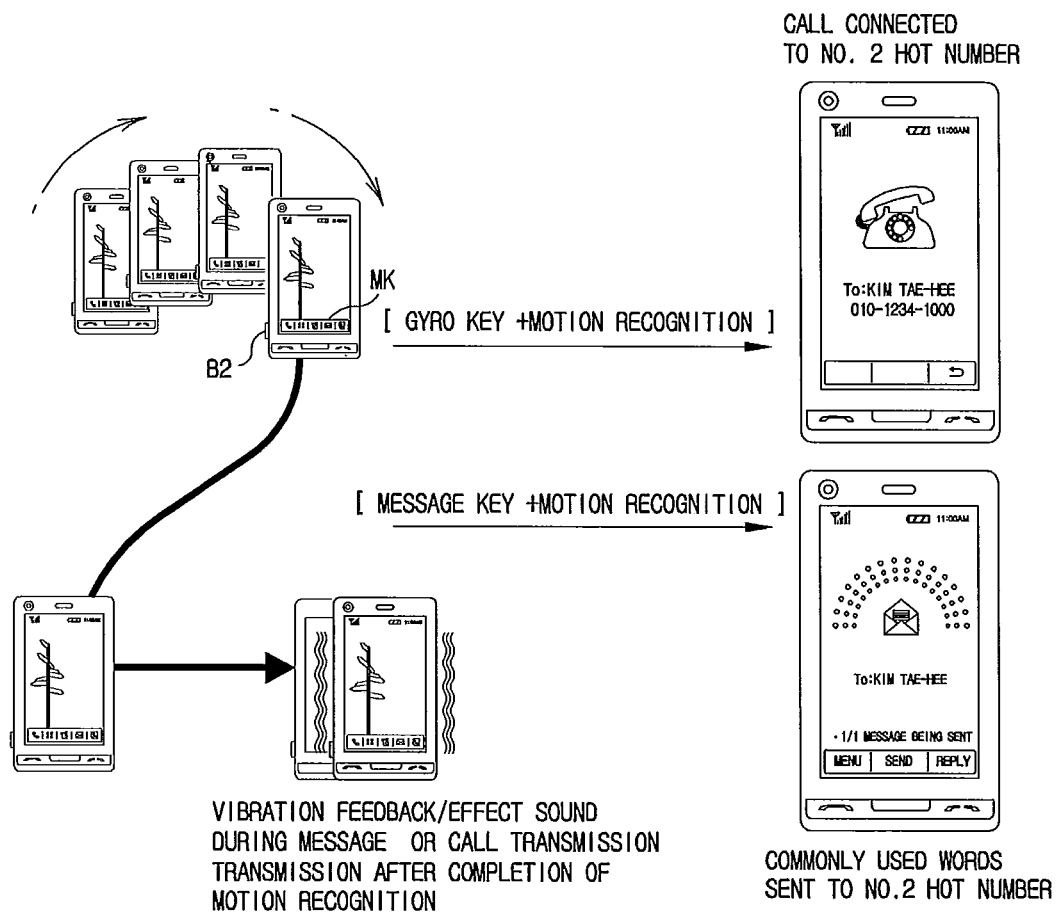
FIG. 18 is a display screen flowchart according to one embodiment of the invention and relating to a function of communication connection/message transmission via a hot-key in a reception waiting mode.

FIG. 18 illustrates an instance where a call connection is tried to a telephone number registered in a numeral hot number, when a portable terminal is shaken in the numerical shape during depression by a user of a particular key (gyro key on the drawing) in the conventional reception waiting mode.

Referring to FIG. 18, when the user constructs a '2' shape by shaking the portable terminal in a depressed state of the gyro key button (B2), the portable terminal recognizes the motion pattern as '2' and tries to make a call connection to a hot number registered as '2', and when the user constructs a '2' shape by shaking the portable terminal in a depressed state of the message key button (MK), the portable terminal recognizes the motion pattern as '2' and transmits a message including commonly-used words to the hot number registered as '2'.

In some exemplary implementation, when the portable terminal is shaken during depression of the number key button, a call connection (or a message transmission) may be attempted to a telephone number registered as a number hot number of the key button.

Figure 19:
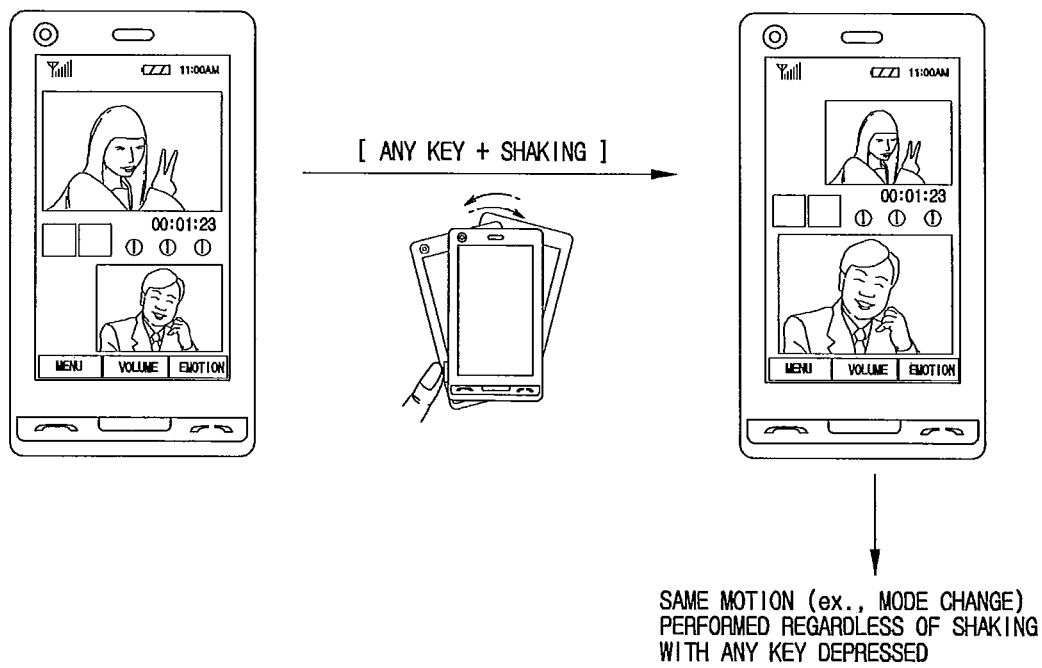
FIG. 19 is a display screen flowchart according to one embodiment of the invention and relating to an image communication mode.

FIG. 19 illustrates an instance where an video call view mode is changed when a user depresses a particular key button or a touch screen to apply a shaking motion in the video call mode of a portable terminal.

Referring to FIG. 19, when the user shakes the portable terminal during depression of any one key button, an opponent image enlarged view mode may be changed to my image enlarged view mode.

In some exemplary implementation, a video call mode of a portable terminal equipped with a touch screen may be changed to a touched image enlarged view mode if the portable terminal is shaken during a touch of a particular image, or the touched image may be transmitted instead.

Figure 20:
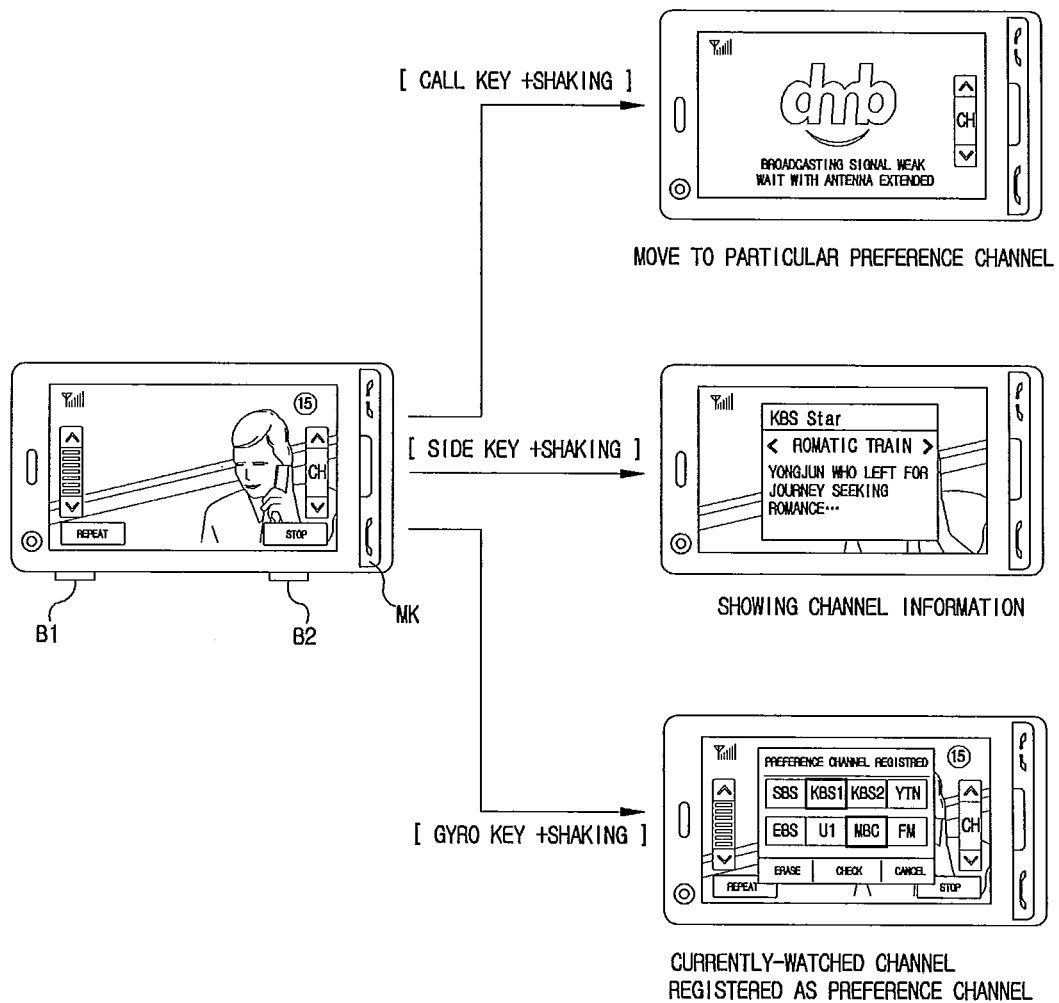
FIG. 20 is a display screen flowchart according to one embodiment of the invention and relating to a DMB (Digital Multimedia Broadcasting) reception mode.

FIG. 20 illustrates an instance where a designated operation is performed, when a user depresses a particular key button and shakes a portable terminal in a DMB (Digital Multimedia Broadcasting) reception mode.

Referring to FIG. 20, if a user who has watched the DMB shakes the portable terminal during depression of a call key button (MC), the portable terminal that has outputted the DMB is changed to a preference channel pre-designated by the user.

As illustrated in FIG. 20, if a user who has watched the DMB shakes the portable terminal during depression of a side key button (B1), the portable terminal that has outputted the DMB displays information relative to the currently-viewed channel.

As illustrated in FIG. 20, if a user who has watched the DMB shakes the portable terminal during depression of a gyro key button (B2), the portable terminal that has outputted the DMB sets up the currently-viewed channel as a preference channel of the user.

Figure 21:
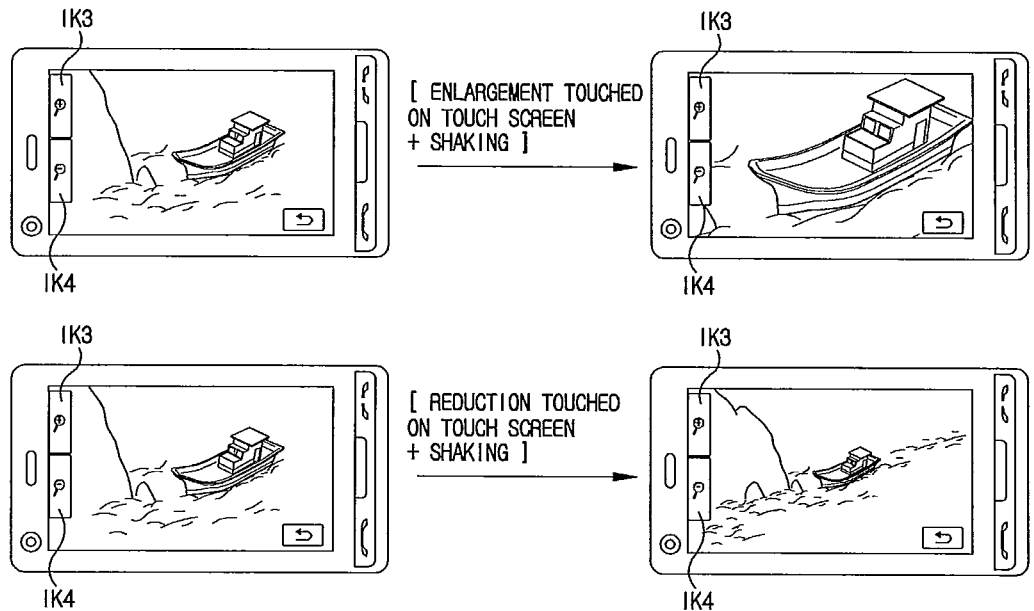
FIG. 21 is a display screen flowchart according to one embodiment of the invention and relating to an image view screen.

FIG. 21 illustrates an instance where a displayed image is enlarged or reduced, when a user applies a shaking motion during depression of a particular key button in a mode of a particular image file of the portable terminal equipped with a touch screen being displayed.

Referring to FIG. 21, a ratio of a touched file image to be enlarged was determined by the shaking times (frequency) in a state of an enlargement key button (IK3) formed by an imaginary button at an upper side of the touch screen being depressed, and a ratio of a touched file image to be reduced was determined by the shaking times (frequency) in a state of a reduction key button (IK4) formed by an imaginary button at a lower side of the touch screen being depressed. Furthermore, the shaking motion may be applied to a portable terminal formed at a side thereof with an enlargement key and a reduction key relative to images. It may be also possible to notify a user the completion of enlargement or reduction of an image via vibration, and to output a vibration while the enlargement or reduction is being progressed.

Figure 22:
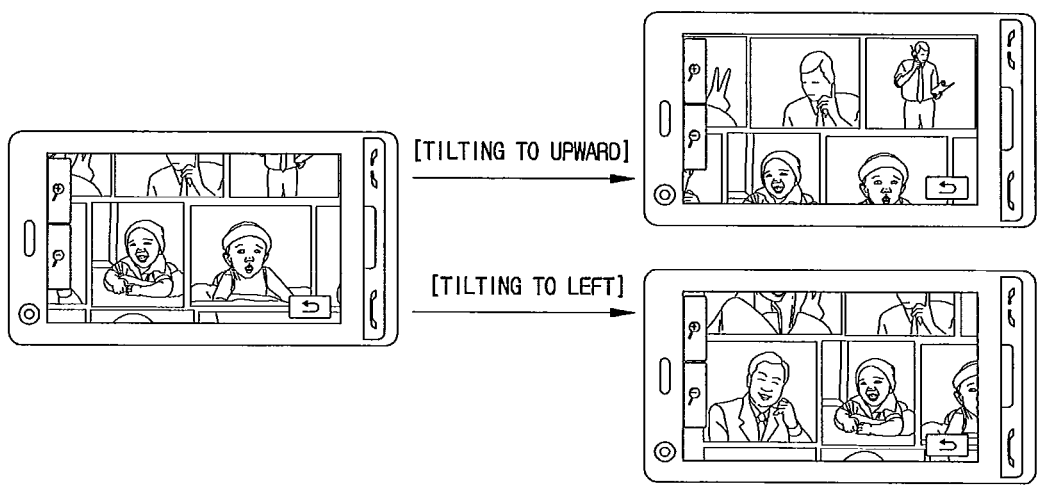
FIG. 22 is a display screen flowchart according to one embodiment of the invention and relating to a thumbnail view screen relative to image files.

When an instruction of further reduction is given during display of a single image file on an entire screen, it may be possible to display a part of a thumbnail list including the image file as shown in the first screen of FIG. 22.

Referring to FIG. 22, when a user applies a tilting motion of the portable terminal upwards (or downwards) of the screen during display of a part of the thumbnail list relative to the image file, a thumbnail of further up position (or further down position) may be displayed, and when a horizontally-tilted motion (left or right) is performed, a left (or right) thumbnail may be displayed. An entire image of the thumbnail list may have a brighter resolution than that of the display of the portable terminal. Even in this case, the user may be notified of the progress of movement of the thumbnail image or completion of the movement of the thumbnail image via vibration or effect sound. Thus, a user may scroll a plurality of images with a predetermined motion. Alternatively, a user may scroll a zoomed single image with a predetermined motion.

In addition, when a user applies a tilting motion of the portable terminal upwards (or downwards) of the screen during display of a part of text relative to the image file, text of further up position (or further down position) may be displayed, and when a horizontally-tilted motion (left or right) is performed, left (or right) text may be displayed. An entire image of the text may have a brighter resolution than that of the display of the portable terminal. Even in this case, the user may be notified of the progress of movement of the thumbnail image or completion of the movement of the thumbnail image via vibration or effect sound. Thus, a user may scroll text with a predetermined motion.

Figure 23:
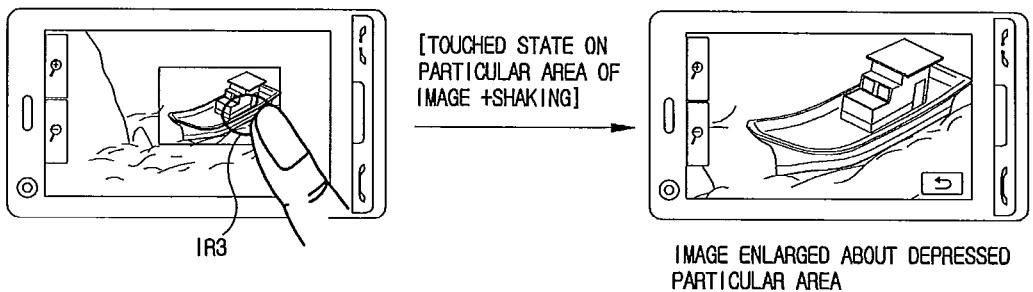
FIG. 23 is a display screen flowchart according to one embodiment of the invention and relating to an image view screen.

FIG. 23 illustrates a circumstance where an image is enlarged and displayed about a touched area in a mode of a particular image file of a portable terminal mounted with a touch screen being displayed, if a user applies a shaking motion during touch of a desired area (IR3) of the displayed image.

Although not shown in the drawing, when another vibration pattern distinguishable from vibration pattern for enlargement is applied during touch by a user of a desired area on the image, it may be possible to display the image in reduced format about the touched area. Furthermore, the completion of enlargement or reduction of the image may be notified to the user via vibration or effect sound.

Figure 24:
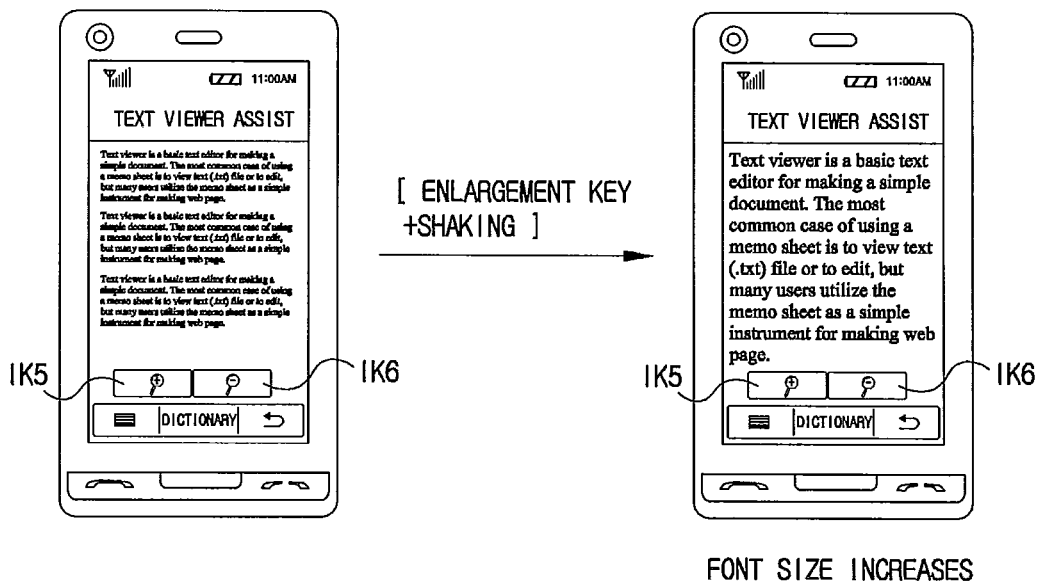
FIG. 24 is a display screen flowchart according to one embodiment of the invention and relating to a text view screen.

FIG. 24 illustrates an instance where a font of a displayed text is enlarged or reduced, when a user applies a shaking motion during depression of a particular key button in a mode of a particular text of a portable terminal formed with a touch screen being displayed.

Referring to FIG. 24, a ratio of enlarging a font of the text was determined according to the shaking times (frequency) during depression of an enlargement key button (IK5) located at a lower area of the touch screen of the portable terminal. Furthermore, it is possible to determine a ratio of reducing the font according to the shaking motion during depression of a reduction key button (IK6) positioned at a lower area of the touch screen of the portable terminal. The determination of ratio of enlargement or reduction of a font may be also applied to a portable terminal having an enlargement key and a reduction key at a side thereof. Furthermore, the user may be notified of completion of enlargement or reduction of the font via vibration. The progress of enlargement or reduction of the font may be also notified to the user via vibration.

Figure 25A:
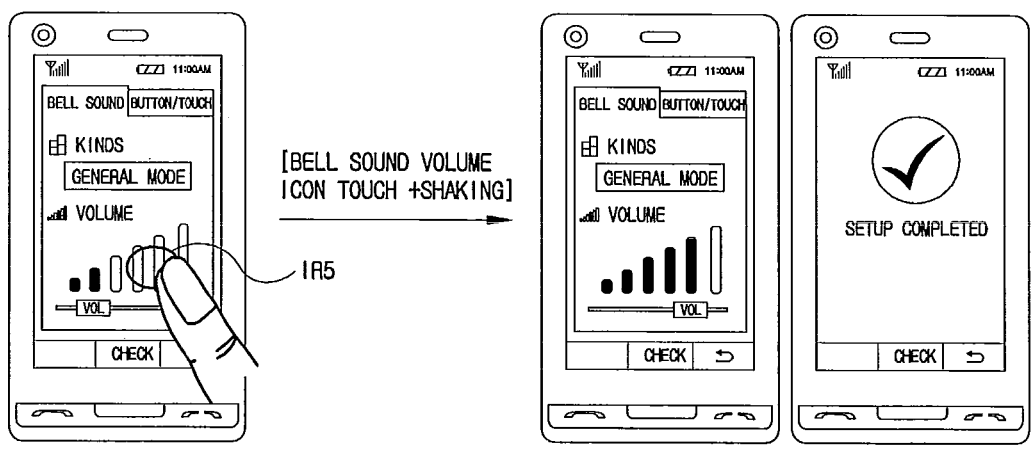
FIG. 25a is a display screen flowchart according to one embodiment of the invention and relating to a bell sound set-up screen.

FIG. 25a illustrates an instance where volume of bell sound is set up by the shaking times (frequency), when a user applies a shaking motion during touch of a bell sound volume icon area (IR5) on a touch screen in a mode of a bell sound setup menu of a portable terminal equipped with the touch screen.

Figure 25B:
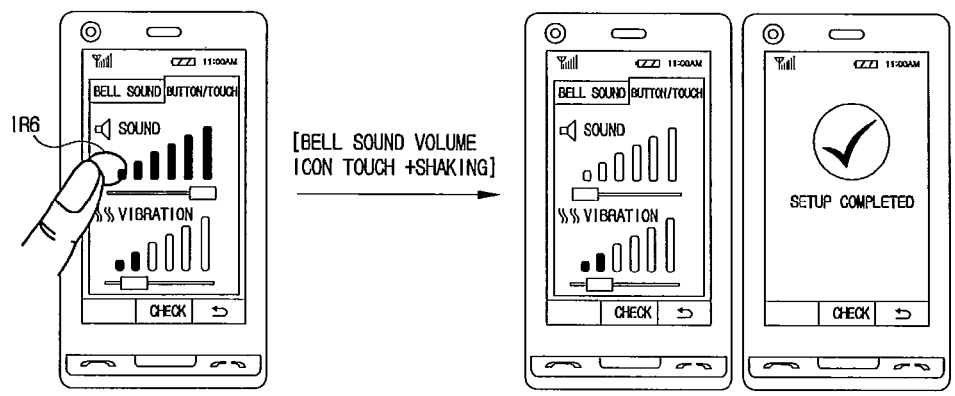
FIG. 25b is a display screen flowchart according to one embodiment of the invention and relating to a button/touch set-up screen.

Furthermore, FIG. 25b illustrates an instance where volume of sound effect is set up by the shaking times (frequency) when a button is depressed, when a user applies a shaking motion during touch of a button volume icon area (IR6) on a touch screen in a mode of executing a button volume setup menu of a portable terminal disposed with the touch screen.

In both instances of FIGS. 25a and 25b, a user may be notified of completion of volume setup via vibration (or effect sound). Furthermore, when a predetermined delay time lapses and after volume of sound is designated by the shaking motion, the designated volume of sound may be automatically set up.

Figure 26A:
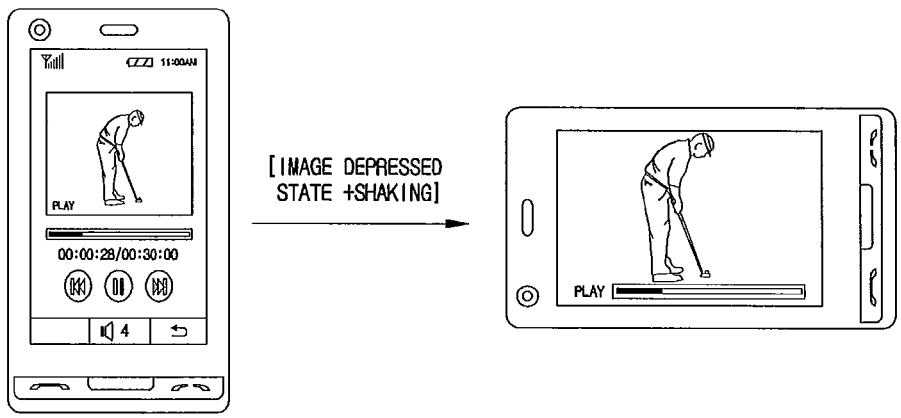
FIGS. 26a and 26b are display screen flowcharts according to one embodiment of the invention and relating to a video reproduction mode.

FIG. 26a illustrates an instance where a video is enlarged and/or an aspect ratio is changed in response to the shaking times (frequency), when a user applies a shaking motion while touching a video reproduction area of a touch screen in a video reproduction mode of a portable terminal disposed with the touch screen.

Figure 26B:
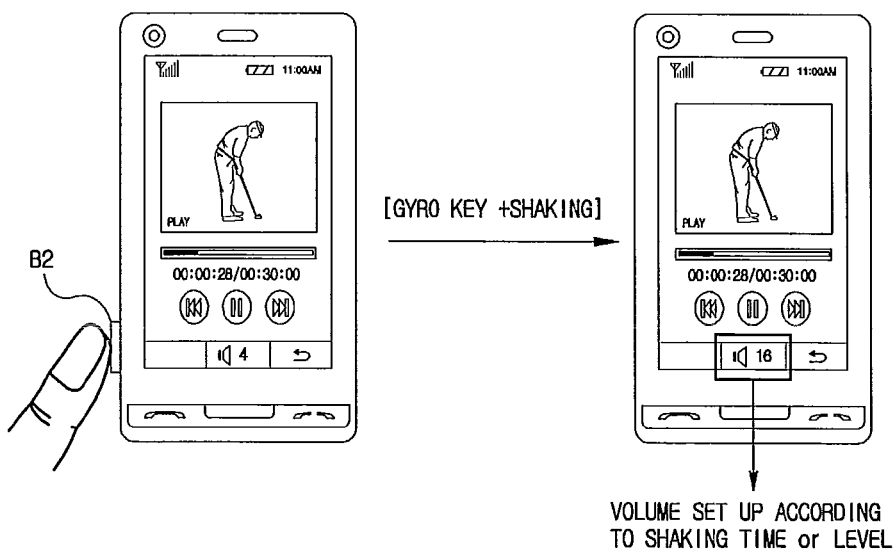

FIG. 26b illustrates an instance where volume is adjusted at a ratio in response to the shaking times (frequency), when a user applies a shaking motion during depression of a gyro key button (B2) located at a side of a portable terminal in a video reproduction mode of the portable terminal disposed with a touch screen. In both instances of FIGS. 26a and 26b, a user may be notified of completion of volume setup via vibration (or effect sound).

Alternatively, a user may fast forward or fast reverse through a video with a predetermined motion of the device.

Furthermore, an electronic dictionary application may be loaded to search for a particular word, when a user applies a shaking motion during touch of the particular word included in a displayed text, in a mode of the text being displayed on a touch screen of a portable terminal.

In the present exemplary implementation, it is preferable that a smart phone having an excellent multitasking operating system be applied, as it is easier to apply the multitasking operating system.

It should be understood that the portable terminal operable by an input of a manual manipulation unit and an input of motion pattern should not be construed as limitations on the scope of the present disclosure or of what may be claimed, but rather as descriptions of features specific to particular implementations of the invention. Certain features that are described in this specification in the context of separate implementations can be selectively implemented in part or in combination of all the implementations.

Although specific implementations of the disclosure have been disclosed, those having ordinary skill in the art will understand that changes can be made to the specific implementations without departing from the spirit and scope of the disclosure. The scope of the invention is not to be restricted, therefore, to the specific implementations, and it is intended that the appended claims cover any and all such applications, modifications, and implementations within the scope of the present disclosure.

It should be also noted that although specific implementations of the disclosure have been disclosed mainly on the shaking motion, other implementations are within the scope of the following claims. For example, other motions such as tilting, pushing, turning and the like that can replace the shaking motion may be applied, which still achieve desirable results and are within the scope of the present disclosure.

What is claimed is:

1. A portable terminal, comprising:
   a motion sensing unit configured to sense a motion pattern of the portable terminal;
   a display configured to display an image;
   a manipulation unit configured to receive a manual manipulation while the image is displayed on the display, wherein the manipulation unit comprises one of a touch screen or a designated key button; and
   a controller operatively connected to the motion sensing unit and the manipulation unit, and configured to:
   interpret a combination of the manual manipulation received from the manipulation unit, followed by a motion pattern sensed by the motion sensing unit as a zoom-in or zoom-out user instruction,
      wherein the manual manipulation includes touching of the touch screen or pressing of the designated key button while the image is displayed on the display, and
      wherein the motion pattern includes a shaking or tilting of the portable terminal generated while the touching of the touch screen or the pressing of the designated key button is maintained; and
   zoom-in or zoom-out the displayed image according to the zoom-in or zoom-out user instruction.

2. The portable terminal of claim 1, wherein the controller is configured to interpret the motion pattern as a number.

3. The portable terminal of claim 1, wherein the controller is further configured to select and display an item of a displayed list on the display when the motion pattern is applied during the touching of the touch screen or the pressing of the designated key button, and
   wherein the displayed image is a thumbnail.

4. The portable terminal of claim 1, wherein the controller is further configured to scroll through a plurality of thumbnails, switch images on the touch screen, or scroll through text when the motion pattern is applied during the touching of the touch screen or the pressing of the designated key button.

5. The portable terminal of claim 1, further comprising:
   a storage containing a motion pattern-instruction database,
   wherein the controller is further configured to access the motion pattern-instruction database to interpret user interpretations including the zoom-in or zoom-out user instruction.

6. The portable terminal of claim 1, wherein according to the zoom-in or zoom-out user instruction, a size of the displayed image is continuously changed as the tilting of the portable terminal continues.

7. The portable terminal of claim 6, wherein as the tilting of the portable terminal continues, the image is displayed on the entire display.

8. The portable terminal of claim 1, wherein the manual manipulation includes the touching of the touch screen while the image is displayed, and
   the motion pattern is the tilting of the portable terminal generated while the touching of the touch screen is maintained.

9. The portable terminal of claim 1, wherein the motion pattern is recognized based on at least one of the following: a strength of the shaking of the portable terminal, a degree and/or direction of the tilting of the portable terminal, a size of a movement of the portable terminal, and a shape of the movement of the portable terminal.

10. The portable terminal of claim 1, wherein when the zooming-in of the displayed image is performed according to the zoom-in user instruction, an image enlargement size of the displayed image varies based on a number of shakings of the portable terminal generated while the touching of the touch screen or the pressing of the designated key button is maintained.

11. The portable terminal of claim 1, wherein the manual manipulation includes the pressing of the designated key button while the image is displayed,
   the motion pattern is the shaking of the portable terminal generated while the pressing of the designated key button is maintained, and
   when the zooming-in or zooming-out of the displayed image is performed according to the zoom-in or zoom-out user instruction, an image enlargement size or an image reduction size of the displayed image varies based on a number of shakings of the portable terminal generated while the pressing of the designated key button is maintained.

12. The portable terminal of claim 1, wherein when the portable terminal is tilted upwardly, downwardly, left or right while the image is displayed on the display, the controller is further configured to display, on the display, the image that has been shifted upwardly, downwardly, left or right, respectively.

13. The portable terminal of claim 1, wherein when the touching of the touch screen involves touching a desired area of the image while the image is displayed on the display and the motion pattern involves the shaking of the portable terminal generated while the desired area of the image is touched, the touched desired area of the image is enlarged in the zoom-in operation.

14. A method of controlling a portable terminal including a motion sensing unit, a display, and a manipulation unit, the method comprising:
   displaying, on the display, an image;
   receiving, via the manipulation unit, a manual manipulation while the image is displayed on the display, wherein the manipulation unit comprises one of a touch screen or a designated key button;
   interpreting a combination of the manual manipulation received from the manipulation unit, followed by a motion pattern sensed by the motion sensing unit as a zoom-in or zoom-out user instruction,
      wherein the manual manipulation includes touching of the touch screen or pressing of the designated key button while the image is displayed on the display, and
      wherein the motion pattern includes a shaking or tilting of the portable terminal generated while the touching of the touch screen or the pressing of the designated key button is maintained; and
   performing, by the portable terminal, a zoom-in or zoom-out of the displayed image according to the zoom-in or zoom-out user instruction.

15. The method of claim 14, further comprising:
interpreting the motion pattern as a number.

16. The method of claim 14, further comprising:
selecting and displaying, on the display, an item of a displayed list when the motion pattern is applied during the touching of the touch screen or the pressing of the designated key button, wherein the displayed image is a thumbnail.

17. The method of claim 14, further comprising one of:
scrolling through a plurality of thumbnails,
switching images on the display, or
scrolling through text when the motion pattern is applied during the touching of the touch screen or the pressing of the designated key button.

18. The method of claim 14, the step of interpreting comprising:
   accessing a motion pattern-instruction database stored in a storage of the portable terminal.

19. The method of claim 14, wherein in the performing step, according to the zoom-in or zoom-out user instruction, a size of the displayed image is continuously changed as the tilting of the portable terminal continues.

20. The method of claim 19, wherein as the tilting of the portable terminal continues, the image is displayed on the entire display.

21. The method of claim 14, wherein the manual manipulation includes the touching of the touch screen while the image is displayed, and
   the motion pattern is the tilting of the portable terminal generated while the touching of the touch screen is maintained.

22. The method of claim 14, wherein the motion pattern is recognized based on at least one of the following: a strength of the shaking of the portable terminal, a degree and/or direction of the tilting of the portable terminal, a size of a movement of the portable terminal, and a shape of the movement of the portable terminal.

23. The method of claim 14, wherein when the zooming-in of the displayed image is performed according to the zoom-in user instruction, an image enlargement size of the displayed image varies based on a number of shakings of the portable terminal generated while the touching of the touch screen or the pressing of the designated key button is maintained.

24. The method of claim 14, wherein the manual manipulation includes the pressing of the designated key button while the image is displayed,
   the motion pattern is the shaking of the portable terminal generated while the pressing of the designated key button is maintained, and
   when the zooming-in or zooming-out of the displayed image is performed according to the zoom-in or zoom-out user instruction, an image enlargement size or an image reduction size of the displayed image varies based on a number of shakings of the portable terminal generated while the pressing of the designated key button is maintained.

25. The method of claim 14, wherein when the portable terminal is tilted upwardly, downwardly, left or right while the image is displayed on the display, the method further comprises displaying, on the display, the image that has been shifted upwardly, downwardly, left or right, respectively.

26. The method of claim 14, wherein when the touching of the touch screen involves touching a desired area of the image while the image is displayed on the display and the motion pattern involves the shaking of the portable terminal generated while the desired area of the image is touched, the touched desired area of the image is enlarged in the zoom-in operation.

* * * * *